United States Patent
Jiang

(10) Patent No.: US 10,863,393 B2
(45) Date of Patent: Dec. 8, 2020

(54) STATE SWITCHING METHOD, STATE KEEPING METHOD, DEVICES AND USER EQUIPMENT

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 91 days.

(21) Appl. No.: 15/892,791

(22) Filed: Feb. 9, 2018

(65) Prior Publication Data

US 2018/0234894 A1    Aug. 16, 2018

(30) Foreign Application Priority Data

Feb. 10, 2017   (CN) .......................... 2017 1 0074385

(51) Int. Cl.
*H04W 36/00* (2009.01)
*H04W 76/27* (2018.01)
*H04W 60/06* (2009.01)
*H04W 68/02* (2009.01)

(52) U.S. Cl.
CPC ....... *H04W 36/0033* (2013.01); *H04W 60/06* (2013.01); *H04W 68/02* (2013.01); *H04W 76/27* (2018.02)

(58) Field of Classification Search
None
See application file for complete search history.

(56) References Cited

U.S. PATENT DOCUMENTS

| 2010/0165970 | A1  | 7/2010  | Lee              |            |
|--------------|-----|---------|------------------|------------|
| 2013/0039339 | A1  | 2/2013  | Rayavarapu et al.|            |
| 2016/0309379 | A1  | 10/2016 | Pelletier et al. |            |
| 2019/0007874 | A1* | 1/2019  | Mildh ............| H04W 36/08 |
| 2019/0174571 | A1* | 6/2019  | Deenoo ..........| H04W 76/28 |
| 2019/0215798 | A1* | 7/2019  | Kim .............| H04L 5/0055|
| 2019/0246342 | A1* | 8/2019  | Wang ............| H04W 36/08 |

FOREIGN PATENT DOCUMENTS

| CN | 101009915 A | 8/2007 |
| CN | 101635664 A | 1/2010 |
| CN | 106658758 A | 5/2017 |

(Continued)

OTHER PUBLICATIONS

Extended European Search Report dated Jun. 13, 2018 in corresponding European Patent Application No. 18156097.0, 6 pages.

(Continued)

*Primary Examiner* — Jutai Kao
(74) *Attorney, Agent, or Firm* — Obion, McClelland, Maier & Neustadt, L.L.P.

(57) ABSTRACT

The disclosure relates to a state switching method, a state keeping method and devices. The method includes determining whether a user equipment (UE) is in an inactive state, wherein the inactive state is an intermediate state between a connect state and an idle state; determining whether the UE meets a predetermined condition; and switching the UE from the inactive state to the idle state when it is determined that the UE is in the inactive state and meets the predetermined condition.

4 Claims, 13 Drawing Sheets

(56) References Cited

FOREIGN PATENT DOCUMENTS

| CN | 108271125 A | 7/2018 |
|---|---|---|
| EP | 3 249 973 A1 | 11/2017 |
| WO | WO 2016123809 | 8/2016 |

OTHER PUBLICATIONS

Combined Chinese Office Action and Search Report dated Jul. 30, 2018 in corresponding Chinese Patent Application No. 201710074385.X (with English Translation), 18 pages.
International Search Report dated Nov. 30, 2017 in PCT/CN2017/101188 (English Translation only), 2 pages.
3GPP TR 23. 799 v1. 0. 1, "3rd Generation Partnership Project; Technical Specification Group Services and System Aspects; Study on Architecture for Next Generation System, (Release 14)", V1.0.1 (Sep. 2016)Technical Report, Sep. 2016, pp. 1-423.
Interdigital Communications: "RAN Controlled State for New Radio Access", 3GPP Draft; R2-166865, Oct. 9, 2016, XP051151306, Retrieved from the Internet: URL:http://www.3gpp.org/ftp/Meetings_3GPP_SYNC/RAN2/Docs/ [retrieved on Oct. 9, 2016].
Mikko Saily et al: "Mobile and wireless communications Enablers for the Twenty-twenty Information Society-II Deliverable D6.1 Draft Asynchronous Control Functions and Overall Control Plane Design", Jun. 30, 2016, XP55322758, Retrieved from the Internet: URL:https://metis-ii.5g-ppp.eu/wp-content/uploads/deliverables/METIS-II_D6.1_V1.O.pdf [retrieved on Nov. 24, 2016].
CATT: "Consideration on Open Issues of State Transition", 3GPP Draft; R2-1700974, Feb. 4, 2017, XP051223331, Retrieved from the Internet: URL:http://www.3gpp.org/ftp/tsg_ran/WG2_RL2/TSGR2_97/Docs/ [retrieved on Feb. 4, 2017].
Interdigital Communications: "State Transition from Inactive to Idle for NR", 3GPP Draft; DRAFT_R2-1701189, Feb. 4, 2017, XP051223218, Retrieved from the Internet: URL:http://www.3gpp.org/ftp/tsg_ran/WG2_RL2/TSGR2_97/Docs/ [retrieved on Feb. 4, 2017].
Huawei et al: "RRC state transition", 3GPP Draft; R2-1701791, Feb. 4, 2017, XP051223688, Retrieved from the Internet: URL:http://www.3gpp.org/ftp/tsg_ran/WG2_RL2/TSGR2_97/Docs/ [retrieved on Feb. 4, 2017].
Second Office Action of the European application No. 18156097.0, dated Mar. 19, 2020, (7 pages).

* cited by examiner

STATE SWITCHING METHOD, STATE KEEPING METHOD, DEVICES AND USER EQUIPMENT

CROSS-REFERENCE TO RELATED APPLICATIONS

This application is based upon and claims priority to Chinese Patent Application Serial No. 201710074385.X, filed on Feb. 10, 2017, the entire contents of which are incorporated herein by reference.

TECHNICAL FIELD

The present disclosure relates to communications, and more particularly, to a state switching method, a state keeping method, devices and user equipment.

BACKGROUND

In a 4th Generation (4G) mobile communication technology, a Radio Resource Control (RRC) state of a User Equipment (UE) includes a connect state and an idle state.

The connect state refers to a state in which there is an RRC connection established between the UE and a base station. The UE may transmit data to and receive data from the base station in the connect state. The idle state refers to a state in which there is no RRC connection established between the UE and the base station. The UE cannot transmit data to the base station in the idle state, but may receive a system message and a paging message transmitted by the base station.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a state switching method. The method includes determining whether a user equipment (UE) is in an inactive state, wherein the inactive state is an intermediate state between a connect state and an idle state; determining whether the UE meets a predetermined condition; and switching the UE from the inactive state to the idle state when it is determined that the UE is in the inactive state and meets the predetermined condition.

In an example, the method determines that the UE meets the predetermined condition when:

(i) an Access Stratum (AS) of the UE receives a first indication from a Non-Access Stratum (NAS), wherein the first indication is configured to prompt the UE to switch a NAS state from a registered state to a deregistered state; or (ii) after the AS of the UE reports to the NAS that the AS state is the inactive state, the AS of the UE receives a second indication from the NAS, wherein the second indication is configured to prompt the UE to establish a Radio Resource Control (RRC) connection; or (iii) the AS of the UE receives a third indication from the NAS, wherein the third indication is configured to prompt the UE to switch the NAS state from the connect state to the idle state, wherein the inactive state in the AS state corresponds to the connect state in the NAS state; or (iv) the AS of the UE receives a fourth indication from the NAS, wherein the fourth indication is configured to prompt the UE to switch the NAS state from the idle state with an inactive state indication to the idle state without any inactive state indication, wherein the inactive state in the AS state corresponds to the idle state with the inactive state indication in the NAS state; or (v) the AS of the UE receives a fifth indication from the NAS, wherein the fifth indication is configured to prompt the UE to switch to the idle state; or (vi) the UE is denied access to a new Public Land Mobile Network (PLMN); or (vii) the UE does not include a Subscriber Identity Module (SIM) card; or (viii) the UE resides in a first-type cell and the UE makes a decision that a first connection establishment request is required to be transmitted to the first-type cell, wherein the first-type cell is configured to provide restricted service, and the first connection establishment request is configured to request access to the first-type cell; or (ix) the UE fails to find any cell that is available for the UE to reside in; or, (x) the UE fails to find any cell that is available for the UE to reside in within a first predetermined time length; or (xi) the UE resides in a second-type cell, wherein the second-type cell is configured to bar execution of a predetermined service in the inactive state; or (xii) the UE receives an access denial message after transmitting a second connection establishment request, wherein the second connection establishment request is configured to request access to a residing cell; or (xiii) the UE receives an access denial message with a sixth indication after transmitting the second connection establishment request, wherein the sixth indication is configured to prompt the UE to switch to the idle state; or (xiv) the UE receives an access denial message without a seventh indication after transmitting the second connection establishment request, wherein the seventh indication is configured to prompt the UE to maintain the inactive state; or (xv) the UE receives an update denial message after transmitting a Radio Access Network (RAN) side location area update request, wherein the RAN side location area update request is configured to request to update a RAN side location area of the UE; or (xvi) a number of times for which update continuously fails after the UE initiates the RAN side location area update request reaches a predetermined number of times; or (xvii) after accessing another network except a target network in a cell reselection process, the UE re-accesses the target network, and a context stored by the UE in the inactive state is lost, wherein the target network is a network that permits the UE to work in the inactive state; or (xviii) the UE accesses a first predetermined network in a cell reselection process, wherein the first predetermined network refers to a preconfigured network that bars a context of the UE in the inactive state; or (xix) a duration for which the UE is kept in the inactive state reaches a second predetermined time length, wherein the second predetermined time length is a preconfigured maximum time length for which the UE is permitted to maintain the inactive state.

According to an aspect, the method includes determining that the UE meets the predetermined condition when the UE resides in the second-type cell; switching the UE from the inactive state to the idle state; and transmitting, by the UE, a third connection establishment request, the third connection establishment request being configured to request access to the second-type cell.

Aspects of the disclosure also provide a state keeping method. The method includes determining whether a user equipment (UE) is in an inactive state, wherein the inactive state is an intermediate state between a connect state and an idle state; determining whether the UE meets a predetermined condition; and keeping the UE in the inactive state when it is determined that the UE is in the inactive state and meets the predetermined condition.

In an example, the method determines that the UE meets the predetermined condition when:

(i) the UE resides in a first-type cell, wherein the first-type cell is configured to provide restricted service; or (ii) the UE fails to find any cell that is available for the UE to reside in; or (iii) the UE resides in a second-type cell, wherein the second-type cell is configured to bar execution of a predetermined service in the inactive state; or (iv) after the UE is denied access to a first Public Land Mobile Network (PLMN), the UE resides in the first-type cell at first, and the UE successfully accesses a second PLMN and resides in a third-type cell according to an indication of a Non-Access Stratum (NAS), wherein the third-type cell is configured to provide regular service; or (v) the UE receives an access denial message with a first indication after transmitting a first connection establishment request, wherein the first connection establishment request is configured to request access to a residing cell, and the first indication is configured to indicate the UE to maintain the inactive state; or (vi) the UE receives an acceptance message after transmitting a Radio Access Network (RAN) side location area update request, the acceptance message includes a second indication that is configured to bar the UE from executing a data transceiving service in the inactive state, wherein the acceptance message is a response that is received after the UE transmits the RAN side location area update request; or (vii) the UE receives the acceptance message after transmitting the RAN side location area update request, and successfully performs a RAN side location area update according to the acceptance message, wherein the acceptance message is a response that is received after the UE transmits the RAN side location area update request without a predetermined Identifier (ID), and the predetermined ID is configured to request to enter the connect state; or (viii) after the UE transmits the RAN side location area update request including the predetermined ID, the UE receives the acceptance message including a denial indication, and successfully performs the RAN side location area update based on the acceptance message, wherein the predetermined ID is configured to indicate that the UE is requesting to enter the connect state, the denial indication is configured to indicate that the UE is barred to enter the connect state, and the acceptance message is a response received after the UE transmits the RAN side location area update request; or (ix) a number of times for which update continuously fails after the UE transmits the RAN side location area update request reaches a first predetermined number of times, the UE retransmits the RAN side location area update request and recounts the number of times after waiting for a first predetermined time length; or (x) the number of times for which update continuously fails after the UE transmits the RAN side location area update request reaches a second predetermined number of times, the UE stops updating and waits until the UE is required to access a residing cell to retransmit the RAN side location area update request or initiates a first connection recovery request, wherein the first connection recovery request is configured to request to recover access to the residing cell based on a context stored in the inactive state; or (xi) the number of times for which update continuously fails after the UE transmits the RAN side location area update request reaches a third predetermined number of times, the UE stops updating and waits until the UE accesses a new cell to reinitiate the RAN side location area update request; or (xii) the UE accesses another network except a target network in a cell reselection process, wherein the target network is a network that permits the UE to work in the inactive state; or (xiii) the UE accesses the another network except the target network in the cell reselection process, and a time length for which the another network has been accessed is within a second predetermined time length, wherein the target network is a network that permits the UE to work in the inactive state; or (xiv) the UE accesses a second predetermined network in the cell reselection process, wherein the second predetermined network is a preconfigured network that permits the UE to keep context in the inactive state, and the second predetermined network belongs to the another network except the target network, wherein the target network is the network that permits the UE to work in the inactive state; or (xv) a duration for which the UE is kept in the inactive state is within a third predetermined time length, wherein the third predetermined time length is a preconfigured maximum time length for which the UE is permitted to maintain the inactive state; or (xvi) the UE fails to initiate connection recovery; or (xvii) the UE fails to transmit data or fails to receive data in the inactive state.

According to an aspect, the method includes determining that the UE meets the predetermined condition when the UE resides in the first-type cell; transmitting, by the UE, a second connection recovery request, wherein the second connection recovery request is configured to recover access to the first-type cell based on the context stored in the inactive state; or deleting, by the UE, the context stored in the inactive state, switching the UE from the inactive state into the idle state, and transmitting, by the UE, a second connection establishment request, wherein the second connection establishment request is configured to request access to the first-type cell; or not transmitting, by the UE, the RAN side location area update request when residing in the first-type cell; or transmitting, by the UE, the RAN side location area update request when accessing the first-type cell for the first time.

According to another aspect, the method includes determining that the UE meets the predetermined condition when the UE resides in the second-type cell; transmitting no RAN side location area update request; or when the UE accesses the second-type cell for the first time, transmitting the RAN side location area update request; or if a RAN side location area of the UE changes, transmitting, by the UE, the RAN side location area update request when accessing a fourth-type cell; or if the UE is switched into the idle state, transmitting, by the UE, the RAN side location area update request when accessing the fourth-type cell; or if the UE receives an update denial message after transmitting the RAN side location area update request, transmitting, by the UE, the RAN side location area update request when accessing the fourth-type cell; or if the UE receives an acceptance message with a third indication after transmitting the RAN side location area update request, transmitting, by the UE, the RAN side location area update request when accessing the fourth-type cell, wherein the third indication is configured to bar the UE from performing a data transceiving service in the inactive state, and wherein the acceptance message is a response received after the UE transmits the RAN side location area update request; or not transmitting, by the UE, the RAN side location area update request when residing in the second-type cell, and transmitting, by the UE, the RAN side location area update request when accessing the fourth-type cell, wherein the fourth-type cell is a preconfigured cell that permits work in the inactive state.

Aspects of the disclosure also provide another state switching method. The method includes determining whether a user equipment (UE) is in an inactive state, wherein the inactive state is an intermediate state between a connect state and an idle state; determining whether the UE meets a predetermined condition; and switching the UE from the inactive state to the connect state when it is determined that the UE is in the inactive state and meets the predetermined condition.

In an example, the method determines that the UE meets the predetermined condition when: the UE transmits a Radio Access Network (RAN) side location area update request, and receives an acceptance message; and the UE successfully performs RAN side location area update according to the acceptance message, wherein the RAN side location area update request includes a predetermined Identifier (ID), the predetermined ID is configured to request to enter the connect state, and the acceptance message is configured to indicate that a location area update of the UE is accepted and the UE is allowed to enter the connect state.

In another example, the RAN side location area update request or a completion message corresponding to the RAN side location area update request further includes a Non-Access Stratum (NAS) message, and before the UE transmits the RAN side location area update request and receives the accepting message. According to an aspect, the method includes transmitting, by the NAS of the UE, the NAS message to an Access Stratum (AS), or, indicating, by the NAS of the UE, the AS to establish a Radio Resource Control (RRC) connection, or, indicating, by the NAS of the UE, the AS to recover the RRC connection.

Aspects of the disclosure also provide a state switching device including a processor and a memory configured to store instructions executable by the processor. The processor is configured to: determine whether a user equipment (UE) is in an inactive state, wherein the inactive state is an intermediate state between a connect state and an idle state; determine whether the UE meets a predetermined condition; and switch the UE from the inactive state to the idle state when it is determined that the UE is in the inactive state and meets the predetermined condition.

Aspects of the disclosure also provide a state keeping device including a processor and a memory configured to store instructions executable by the processor. The processor is configured to: determine whether a user equipment (UE) is in an inactive state, wherein the inactive state is an intermediate state between a connect state and an idle state; determine whether the UE meets a predetermined condition; and keep the UE in the inactive state when it is determined that the UE is in the inactive state and meets the predetermined condition.

Aspects of the disclosure also provide a state switching device including a processor and a memory configured to store instructions executable by the processor. The processor is configured to: determine whether a user equipment (UE) is in an inactive state, wherein the inactive state is an intermediate state between a connect state and an idle state; determine whether the UE meets a predetermined condition; and switch the UE from the inactive state to the connect state when it is determined that the UE is in the inactive state and meets the predetermined condition.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the present disclosure and, together with the description, serve to explain the principles of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the disclosure. Instead, they are merely examples of apparatuses and methods consistent with aspects related to the disclosure as recited in the appended claims.

The terms "first", "second" and similar words mentioned in the present disclosure are adopted not to represent any sequence, number or importance but only to distinguish different parts. Similarly, similar words such as "one" or "a" also represent no number limits but existence of at least one. Similar words such as "connection" or "mutual connection" are not limited to physical or mechanical connection, but may include electrical connection, either direct or indirect.

The term "module" mentioned in the present disclosure usually refers to a process or instruction stored in a memory and capable of realizing some functions. The term "unit" mentioned in the present disclosure usually refers to a functional structure which is logically divided, and the "unit" may be implemented by pure hardware or implemented by a combination of software and hardware.

The term "multiple" or the wording "a plurality of" mentioned in the present disclosure refers to two or more than two. "And/or" describes an association relationship of associated objects, and represents that there may exist three relationships. For example, A and/or B may represent the following three conditions: A independently exists, A and B simultaneously exist, and B independently exists. Character "/" usually represents that former and latter associated objects form an "or" relationship.

Figure 1:
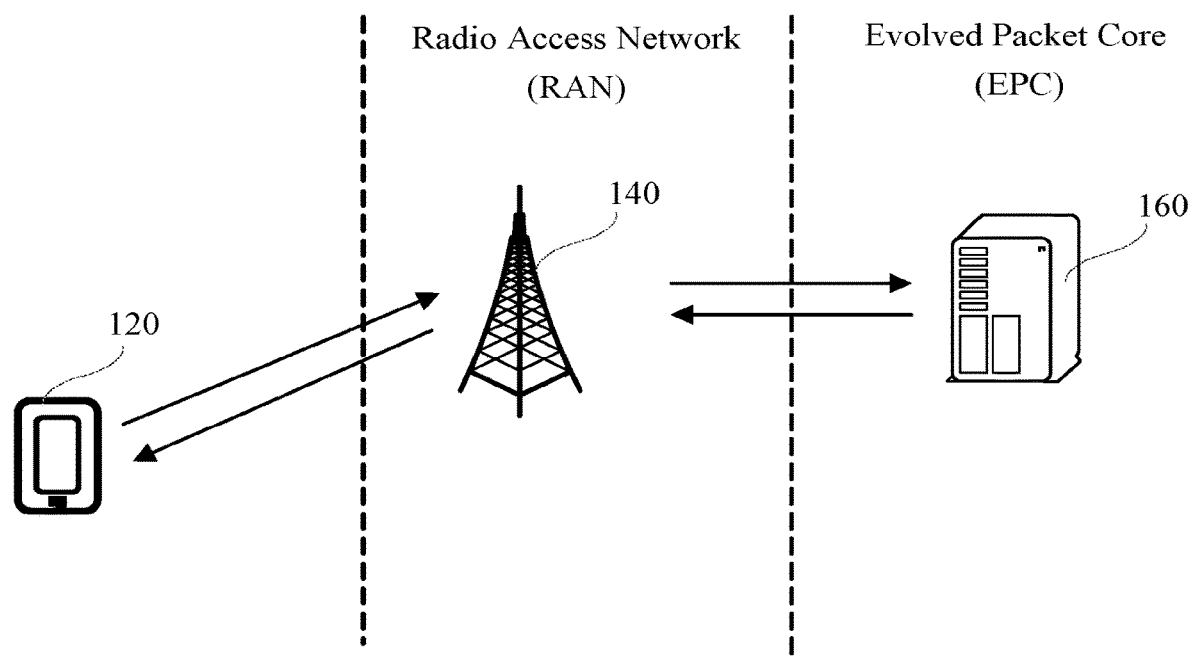
FIG. 1 is a structure diagram of a mobile communication system according to an exemplary aspect of the present disclosure.

FIG. 1 is a structure diagram of a mobile communication system according to an exemplary aspect of the present disclosure. Optionally, the mobile communication system is a 5G system. The 5G system is also called a New Radio (NR) system. The mobile communication system may also be a 5G-system-based next-generation communication system. There are no limits made in the aspect. The mobile communication system includes UE 120, access network equipment 140 and a Mobility Management Entity (MME) terminal 160.

The UE 120 refers to equipment performing data communication with the access network equipment 140. The UE 120 may communicate with one or more core networks through a Radio Access Network (RAN). The UE 120 may also be called a subscriber unit, a subscriber station, a mobile station, a mobile, a remote station, an access point, a remote terminal, an access terminal, a user terminal, a user agent and a user device. Optionally, the UE 120 may also be relay equipment, which will not be limited in the aspect.

Relative to the UE 120, the access network equipment 140 and the MME 160 belong to a network side. The network side includes the RAN and an Evolved Packet Core (EPC). The RAN is responsible for all radio related functions, including scheduling, radio resource management, a retransmission protocol, coding, various multi-antenna solutions and the like. The EPC is responsible for radio unrelated functions required to provide a complete mobile broadband network, including authentication, a charging function, establishment of a peer-to-peer connection and the like. The access network equipment 140 is network element equipment in the RAN, and the MME 160 is network element equipment in the EPC.

A wireless connection is established between the UE 120 and the access network equipment 140 through a wireless air interface. Optionally, the wireless air interface is a 5G-standard-based wireless air interface. For example, the wireless air interface is an NR. Alternatively, the wireless air interface may also be a wireless air interface based on a next-generation mobile communication network technology of 5G. Optionally, the wireless air interface is also compatible with a wireless air interface in an early-generation mobile communication network technology of 2nd Generation (2G), 3rd Generation (3G), 4th Generation (4G) and the like.

The access network equipment 140 may be a base station. The base station may be configured to mutually convert a received radio frame and an Internet Protocol (IP) packet message, and may also coordinate attribute management over an air interface. For example, the base station may be a gNode-B (gNB) in a 5G system. Optionally, the gNB is a base station adopting a central distributed architecture. When adopting the central distributed architecture, the access network equipment 140 usually includes a Central Unit (CU) and at least two Distributed Units (DUs). Protocol stacks of a Packet Data Convergence Protocol (PDCP) layer, a Radio Link Control (RLC) layer and a Media Access Control (MAC) layer are set in the CU. Physical (PHY) protocol stacks are set in the DUs. A specific implementation manner for the access network equipment 140 will not be limited in the aspect.

The access network equipment 140 is also connected with the MME 160 through a wireless network or a wired network (for example, an optical communication network).

The MME 160 is responsible for bearer connection/release, state management and security key management of the UE.

Figure 2:
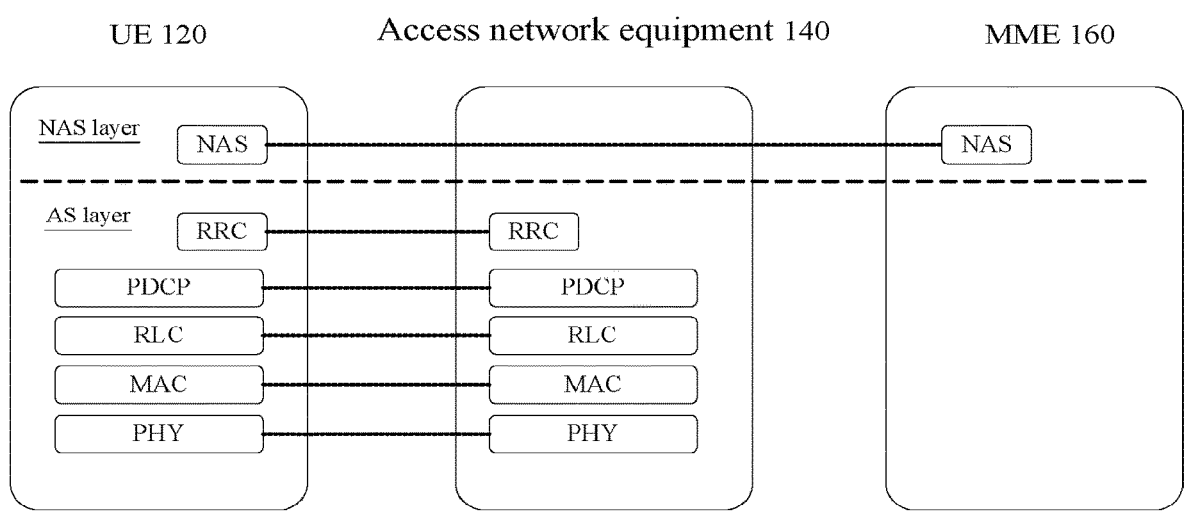
FIG. 2 is a protocol architecture diagram of a mobile communication system according to an exemplary aspect of the present disclosure.

FIG. 2 is a protocol architecture diagram of a mobile communication system according to an exemplary aspect of the present disclosure. Equipment in the protocol architecture diagram includes UE 120, access network equipment 140 and an MME 160.

Protocol entities in the UE 120 are divided into two strata: a Non-Access Stratum (NAS) and an Access Stratum (AS).

The NAS of the UE 120 communicates with a NAS of the MME 160 to complete a functional operation between an EPC and a terminal.

The AS of the UE 120 includes a PDCP entity, an RLC protocol entity, a MAC protocol entity and a PHY protocol entity. The AS of the UE 120 communicates with an AS of the access network equipment 140 to complete a functional operation between the UE and a RAN. For example, the AS is responsible for establishment of an RRC connection, transmission of an RRC message, establishment of a radio bearer, cancellation of the radio bearer, cutting-off of the RRC connection and the like.

The NAS and AS of the UE 120 may be switched between different states respectively.

Figure 3:
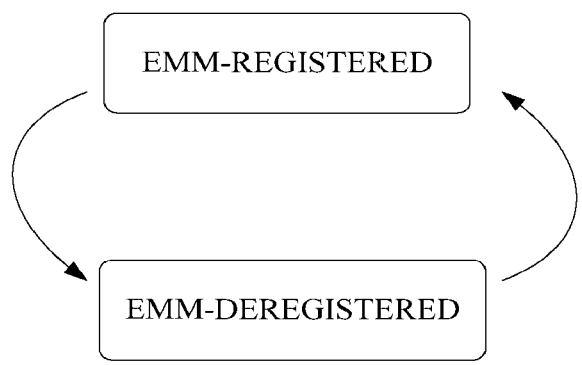
FIG. 3 is a schematic diagram illustrating a NAS state according to an exemplary aspect of the present disclosure.

With reference to FIG. 3, a NAS state of the UE 120 includes two major states: an EMM-REGISTERED state and an EMM-DEREGISTERED state. EMM is an abbreviation of EPS mobility management. When the NAS of the UE 120 completes registration in the MME 160, the NAS state is the EMM-REGISTERED state. When the NAS 111 of the UE 120 does not complete registration or cancels registration in the MME 160, the NAS state is the EMM-DEREGISTERED state. Optionally, the EMM-REGISTERED state may also be divided into a plurality of sub-states. For example, the EMM-REGISTERED state is further divided into an EMM-connected state and an EMM-idle state.

Figure 4:
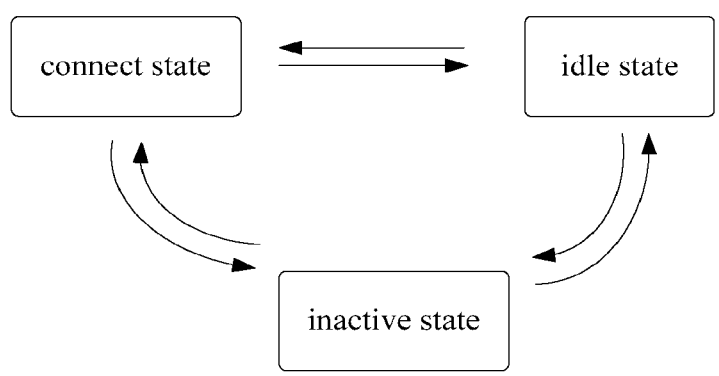
FIG. 4 is a schematic diagram illustrating an AS state according to an exemplary aspect of the present disclosure.

With reference to FIG. 4, an AS state of the UE 120 includes a connect state, an inactive state and an idle state, and the AS state is also called an RRC state. An AS state in a 4G system only includes the connect state and the idle state, so that the inactive state is a new state introduced into a 5G system.

The inactive state is an intermediate state between the connect state and the idle state. The inactive state includes, but not limited to, at least one of the following characteristics.

1. In the inactive state, the UE 120 may keep a context created in the connect state, and the context may also be called a UE context, an RRC context and the like. The context includes a mobile phone network capability, authentication information, a negotiated security algorithm, a generated key, created connection information, bearer information and the like. Correspondingly, the access network equipment may also store the context of the UE 120.

2. In the inactive state, the UE 120 may receive and transmit a predetermined data service. Optionally, the predetermined data service is a small data packet service. For example, the UE is onboard equipment in Internet of vehicles equipment or sensor equipment in Internet of things equipment, and may receive and transmit a small data packet in the inactive state.

3. In the inactive state, Mobile Management (MM) is based on a cell reselection mechanism.

Herein, MM is management over location information, security and service continuity of a mobile terminal. Simply speaking, the UE 120 is kept mobile, MM is that the UE performs a location area update flow with a network side to enable the network side to learn about a current cell location of the UE when entering a new cell or tracking area.

When the UE 120 is in the connect state, MM is performed based on a cell handover mechanism. When the UE 120 is in the idle state, MM is performed based on cell reselection.

The network side includes the EPC and the RAN. A location area update flow between the UE 120 and the MME 160 may be called NAS location area update or EPC side location area update. A location area update flow between the UE 120 and the access network equipment 140 may be called RAN side location area update or AS location area update.

In the 5G system, the AS state of the UE 120 includes the connect state, the inactive state and the idle state.

Optionally, when the UE 120 is switched from the connect state to the inactive state, the UE 120 is required to store the context.

Optionally, when the UE 120 is switched from the inactive state to the connect state, if the UE 120 transmits an RRC connection recovery request to the access network equipment 140, the UE 120 re-establishes an RRC connection with a residing cell provided by the access network equipment 120 in a recovery form by adopting the context stored in the inactive state, and is switched to the connect state after successfully re-establishing the RRC connection; and if the UE 120 transmits an RRC connection establishment request to the access network equipment 140, the UE 120 deletes the context stored in the inactive state, and the UE 120 establishes the RRC connection with the residing cell provided by the access network equipment 120 in a creation form.

Optionally, when the UE 120 is switched from the inactive state to the idle state, the UE 120 deletes the context stored in the inactive state, and then is switched to the idle state.

Herein, determining a specific triggering condition for triggering the UE 120 to switch among the three states is a technical problem to be solved by individual aspects of the present disclosure.

Figure 5:
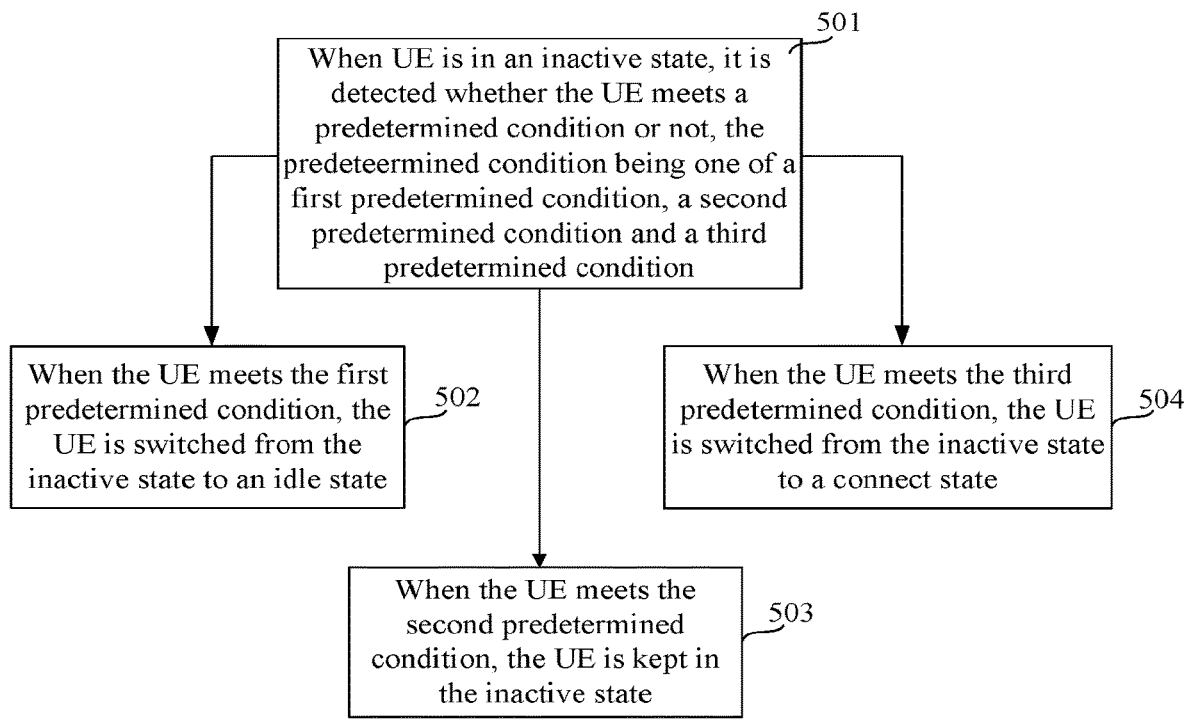
FIG. 5 is a flow chart showing a state switching method according to an exemplary aspect of the present disclosure.

FIG. 5 is a method flow chart showing a state switching method according to an exemplary aspect. As shown in FIG. 5, the state switching method is applied to UE 120 in a mobile communication system shown in FIG. 1, and the method includes the following steps.

In Step 501, when the UE is in an inactive state, it is detected whether the UE meets a predetermined condition or not. The predetermined condition is one of a first predetermined condition, a second predetermined condition and a third predetermined condition.

When an AS state (or called an RRC state) of the UE is in the inactive state, it is detected whether the UE meets the predetermined condition or not, the predetermined condition being the first predetermined condition, the second predetermined condition and the third predetermined condition.

In some aspects, the "detection" action in Step 501 may be eliminated. For example, after the first predetermined condition, the second predetermined condition or the third predetermined condition is triggered, Step 502 or Step 503 or Step 504 is directly executed, which will not be limited in the aspect.

In Step 502, when the UE meets the first predetermined condition, the UE is switched from the inactive state to an idle state.

That is, the AS state (or called the RRC state) of the UE is switched from the inactive state to the idle state.

In Step 503, when the UE meets the second predetermined condition, the UE is kept in the inactive state.

That is, the AS state (or called the RRC state) of the UE is kept in the inactive state.

In Step 504, when the UE meets the third predetermined condition, the UE is switched from the inactive state to a connect state.

That is, the AS state (or called the RRC state) of the UE is switched from the inactive state to the connect state.

For Step 502, Step 503 and Step 504, only one branch or any two branches may be executed in different aspects, which will not be limited in the aspect of the present disclosure.

From the above, according to the state switching method provided in the aspect of the present disclosure, the inactive state is added in the UE, so that the UE in the inactive state may receive and transmit a small data packet service without being switched to the connect state. Thus, the problem of signaling resource waste caused by the fact that the UE is required to be switched between the connect state and the idle state even during transceiving of the small data packet service in 4G is solved, thereby enabling the UE in the inactive state to receive and transmit the small data packet service, saving signaling resources and increasing the speed of transceiving a small data packet.

Figure 6A:
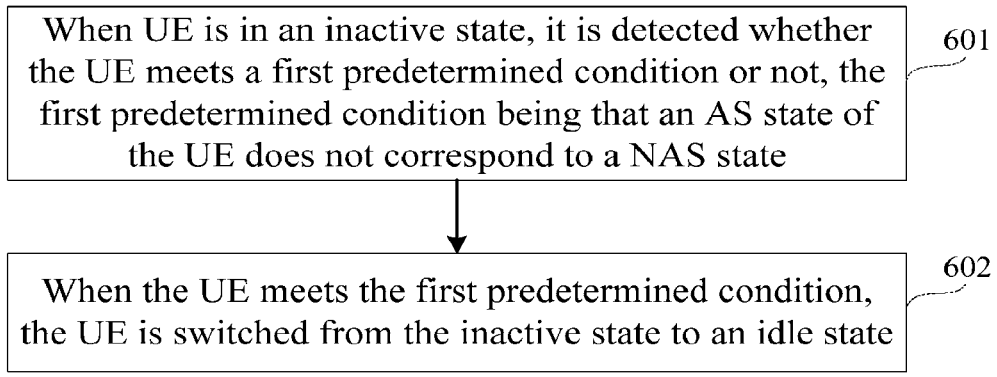
FIG. 6A is a flow chart showing a state switching method according to an exemplary aspect of the present disclosure.

FIG. 6A is a flow chart showing a state switching method according to an exemplary aspect. As shown in FIG. 6A, the state switching method is applied to UE 120 in a mobile communication system shown in FIG. 1, and the method includes the following steps.

In Step 601, when the UE is in an inactive state, it is detected whether the UE meets a first predetermined condition or not, the first predetermined condition being that an AS state of the UE does not correspond to a NAS state.

In the aspect, the AS state of the UE is the inactive state.

The inactive state of an AS of the UE may correspond to one or some certain sub-states of a NAS. For example, the inactive state of the AS corresponds to a state A of the NAS. When the state A of the NAS is switched into a state B, since the state B does not correspond to the inactive state of the AS, there may be the problem of state mismatching between the AS and the NAS.

In Step 602, when the UE meets the first predetermined condition, the UE is switched from the inactive state to an idle state.

For a scenario where the AS state of the UE does not correspond to the NAS state, the first predetermined condition specifically includes at least one of the following conditions.

1. The first predetermined condition includes that the AS of the UE receives a first indication of the NAS, the first indication being configured to indicate the NAS state to be switched from an EMM-REGISTERED state to an EMM-DEREGISTERED state.

Switching the NAS state of the UE into the EMM-DEREGISTERED state is usually related to local detach of the UE. In other words, after local detach of the UE, the NAS state is switched into the EMM-DEREGISTERED state. Detach includes two types of local detach of the UE and network side detach. A local detach procedure of the UE is involved in the aspect.

In a possible implementation, the UE cannot find a cell to reside within a period of time, and thus locally deactivates all EPS bearers and executes local detach.

In another possible implementation, the UE transmits a detach request, but the detach request is denied by a residing cell, and a reason for denial is that "access is barred for originating signaling". Then, the UE executes local detach.

In yet another possible implementation, the UE performs a local detach operation after receiving a paging message including an International Mobile Subscriber Identification Number (IMSI) of the UE. A base station may page the UE with a Cell Radio-Network Temporary Identifier (C-RNTI) when storing a context of the UE. The base station may page the UE with the IMSI if losing the context of the UE. If the UE receives the paging message containing the IMSI from the base station, it is indicated that the base station loses the context of the UE, and the UE executes local detach.

During a practical application, during local detach of the UE caused by any factor, the NAS state may be switched from the EMM-REGISTERED state to the EMM-DEREGISTERED state, thereby making the AS and NAS states mismatched. Under such a condition, the UE is required to be switched from the inactive state to the idle state.

2. The first predetermined condition includes that after the AS of the UE reports that an AS state is the inactive state to the NAS, the AS of the UE receives a second indication of the NAS, the second indication being configured to indicate the UE to establish an RRC connection.

Under such a scenario, the NAS does not directly notify the AS of the NAS state. Instead, the AS is required to actively report the AS state to the NAS, and the state actively reported by the AS to the NAS may be the connect state, the inactive state and the idle state.

After the AS of the UE reports that the AS state is the inactive state to the NAS, the NAS directly indicates a specific operation to the AS.

Optionally, the AS periodically reports the AS state to the NAS, or the AS reports the AS state to the NAS when the AS state changes.

Since the AS stores the context in the inactive state, the NAS usually transmits a connection recovery indication to the AS to recover an RRC connection between the UE and the base station according to the stored context. However, if the NAS transmits the second indication to the AS for some reasons, the second indication being configured to indicate the UE to establish the RRC connection with the base station in a creation manner, the UE deletes the stored context, is switched back to the idle state, and transmits a connection establishment request to the base station to establish the RRC connection with the base station in the creation manner.

3. The first predetermined condition includes that the AS of the UE receives a third indication of the NAS, the third indication being configured to indicate the NAS state to be switched from an EMM-connected state to an EMM-idle state.

The inactive state in the AS state corresponds to the EMM-connected state in the NAS state, or, the inactive state in the AS state is matched with the EMM-connected state in the NAS state. When the NAS state has been switched into the EMM-idle state, the AS is also required to be switched from the inactive state to the idle state.

4. The first predetermined condition includes that the AS of the UE receives a fourth indication of the NAS, the fourth indication being configured to indicate the NAS state to be switched from an EMM-idle state with an inactive state indication to an EMM-idle state without any inactive state indication.

The inactive state in the AS state corresponds to the EMM-idle state with the inactive state indication in the NAS state, or, the inactive state in the AS state is matched with the EMM-idle state with the inactive state indication in the NAS state.

When the NAS state has been switched from the EMM-idle state with the inactive state indication to the EMM-idle state without the inactive state indication, the AS is also required to be switched from the inactive state to the idle state.

5. The first predetermined condition includes that the AS of the UE receives a fifth indication of the NAS, the fifth indication being configured to indicate the UE to be switched into the idle state, or, the fifth indication being configured to indicate the AS of the UE to be switched into the idle state.

6. The first predetermined condition includes that the UE is denied when accessing a new PLMN.

UE which has been registered may also search for a new PLMN under some conditions, for example, the condition that a service request or a tracking area update request is denied.

The UE may transmit the tracking area update request to the base station after selecting the new PLMN. If the base station replies that the PLMN is not allowed to be accessed, the NAS state of the UE is switched into the EMM-DEREGISTERED state, and meanwhile, the AS of the UE is switched into the idle state.

From the above, according to the state switching method provided in the aspect of the present disclosure, when the AS and NAS states of the UE are mismatched, the UE is switched from the inactive state to the idle state, thereby facilitating to save resources of the UE.

Figure 6B:
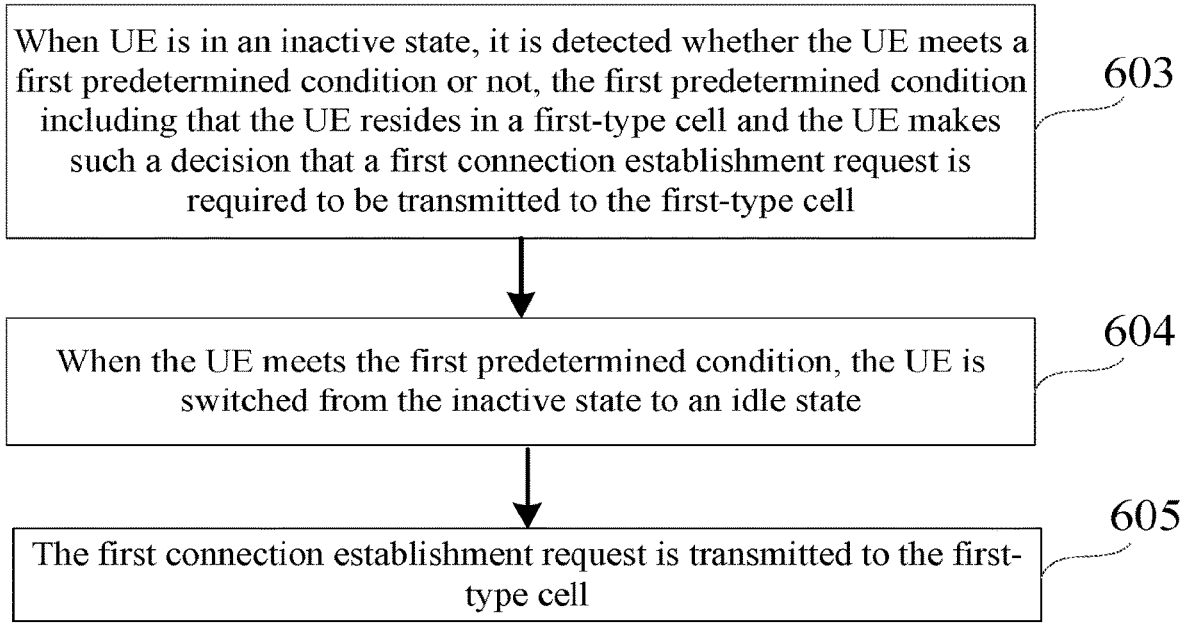
FIG. 6B is a flow chart showing a state switching method according to an exemplary aspect of the present disclosure.

FIG. 6B is a flow chart showing a state switching method according to an exemplary aspect. As shown in FIG. 6B, the state switching method is applied to UE 120 in an implementation environment shown in FIG. 1, and includes the following steps.

In Step 603, when the UE is in an inactive state, it is detected whether the UE meets a first predetermined condition or not, the first predetermined condition including that when the UE resides in a first-type cell, a decision making result of the UE is that a first connection establishment request is required to be transmitted to the first-type cell.

The first-type cell refers to a cell configured to provide restricted service. The first-type cell is also called an acceptable cell. Optionally, the first-type cell may only provide a service such as an emergency call.

When a residing cell of the UE is the first-type cell, if the UE makes such a decision that an RRC connection is required to be re-established according to a service requirement, Step 604 is executed.

Optionally, transmitting of the first connection establishment request may be determined by an AS, and may also be determined by the AS indicated by a NAS.

In Step 604, when the UE meets the first predetermined condition, the UE is switched from the inactive state to an idle state.

That is, the UE deletes a context stored in the inactive state, and an AS state of the UE is switched from the inactive state to the idle state. However, it is noted that the step is an optional step, and the UE may also directly execute Step 605 under the condition of being kept in the inactive state.

In Step 605, the UE transmits a connection establishment request to the first-type cell.

That is, after the AS state of the UE is switched into the idle state, the connection establishment request is transmitted to the first-type cell.

It is noted that Step 603 to Step 605 in the aspect and the steps in the previous aspect have no direct sequential association, and may be independently executed respectively.

From the above, according to the state switching method provided in the aspect of the present disclosure, when the UE resides in the first-type cell, if being required to access the first-type cell, the UE deletes the stored context, is switched back to the idle state, and then initiates the connection establishment request.

Figure 6C:
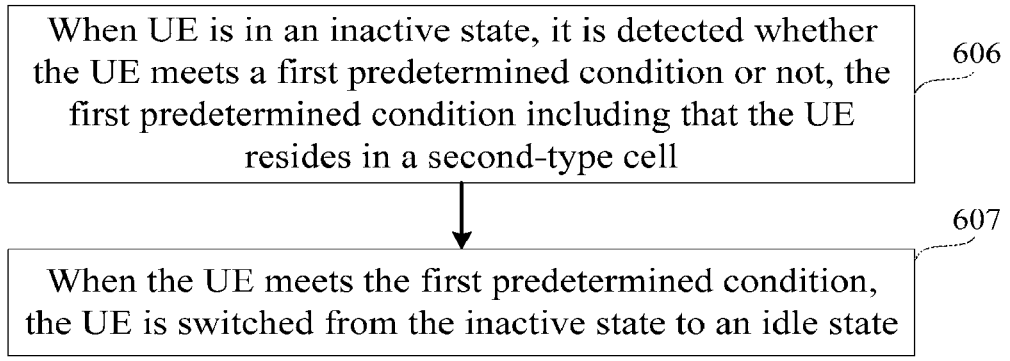
FIG. 6C is a flow chart showing a state switching method according to an exemplary aspect of the present disclosure.

FIG. 6C is a flow chart showing a state switching method according to an exemplary aspect. As shown in FIG. 6C, the state switching method is applied to UE 120 in a mobile communication system shown in FIG. 1, and includes the following steps.

In Step 606, when the UE is in an inactive state, it is detected whether the UE meets a first predetermined condition or not, the first predetermined condition including that the UE resides in a second-type cell.

The second-type cell refers to a preconfigured cell barring work in the inactive state. Herein, "preconfigured" refers to configuration by access network equipment by transmitting signaling in advance.

During a practical application, a base station preconfigures at least one piece of information in a cell list, area ID (or called a RAN notification area ID), frequency and PLMN barring work in the inactive state to the UE. The UE may reside in a cell in the cell list, or reside in a cell belonging to the area ID, or reside in a cell of the specified frequency or PLMN. Although a residing priority of the UE in the second-type cell is lower than a residing priority in a cell (i.e. a normal cell) allowing work in the inactive state, it is still possible to select the second-type cell when the UE selects the residing cell.

In Step 607, when the UE meets the first predetermined condition, the UE is switched from the inactive state to an idle state.

If the UE resides in the second-type cell, the UE deletes a context stored in the inactive state, and enters the idle state.

Optionally, after the UE is switched from the inactive state to the idle state, if there is made such a service decision that an RRC connection is required to be established, the UE transmits a second connection establishment request to the second-type cell, the second connection establishment request being configured to request to access the second-type cell.

It is noted that Step 606 to Step 607 in the aspect and the steps in the previous aspect have no direct sequential association, and may be independently executed respectively.

From the above, according to the state switching method provided in the aspect of the present disclosure, when the UE resides in the cell barring work in the inactive state, switching to the idle state may save computing resources of the UE.

In other optional aspects of the present disclosure, when the UE meets any one of the following other first predetermined conditions in the inactive state, the UE is switched from the inactive state to the idle state.

Optionally, the first predetermined condition includes that a SIM card is not inserted into the UE. The SIM card being not inserted includes that an original state is uninserted, or the SIM card which has been inserted is extracted.

Optionally, the first predetermined condition includes that the UE does not find any cell where the UE can reside.

Optionally, the first predetermined condition includes that a duration for which the UE does not find any cell where the UE can reside reaches a first predetermined time length.

Optionally, the first predetermined time length is preconfigured by a network side, or is self-defined by the UE.

Optionally, the first predetermined condition includes that the UE receives an access denial message after transmitting a third connection establishment request. The third connection establishment request is configured to request to enable the UE to access the residing cell.

The UE transmits the third connection establishment request to the base station, the base station transmits a connection establishment denial message to the UE, and the UE is switched from the inactive state to the idle state according to the connection establishment denial message.

Optionally, the first predetermined condition includes that the UE receives an access denial message containing a sixth indication after transmitting the third connection establishment request. The third connection establishment request is configured to request to enable the UE to access the residing cell, and the sixth indication is configured to indicate the UE to be switched into the idle state.

Optionally, after the UE transmits the third connection establishment request to the base station, the base station transmits the access denial message to the UE, the access denial message containing an indication of entering the idle state, and the UE is switched into the idle state according to the access denial message.

Optionally, the first predetermined condition includes that the UE receives an access denial message not containing a seventh indication after transmitting the third connection establishment request. The third connection establishment request is configured to request to enable the UE to access the residing cell, and the seventh indication is configured to indicate the UE to be kept in the inactive state.

The UE transmits the third connection establishment request to the base station, the base station transmits to the UE the access denial message not containing any indication about that the UE is kept in the inactive state. Since the base station does not clearly indicate that the UE is kept in the inactive state, the UE is switched into the idle state according to the access denial message.

Optionally, the first predetermined condition includes that the UE receives an update denial message after transmitting a RAN side location area update request. The RAN side location area update request is configured to request to update a RAN side location area of the UE. Since the base station denies location area update of the UE, the UE is switched into the idle state according to the update denial message.

Optionally, the first predetermined condition includes that the number of times for which update continuously fails after the UE initiates the RAN side location area update request reaches the predetermined number of times.

During practical implementation, when the UE fails to transmit the RAN side location area update request or does not receive any message returned by the base station, the UE may not complete update.

Optionally, the first predetermined condition includes that after accessing another network except a target network in a cell reselection process, the UE re-accesses the target network, and a context stored by the UE in the inactive state is lost. The target network is a network supporting the UE to work in the inactive state. Optionally, the target network is a 5G network.

During a practical application, a wireless network A is a network barring work in the inactive state, and a wireless network B is a network allowing work in the inactive state. When the UE is switched from the wireless network A to the wireless network B, if the context of the UE is lost, the UE is required to be switched back to the idle state.

Optionally, the first predetermined condition includes that the UE accesses a first predetermined network in the cell reselection process. The first predetermined network refers to a preconfigured network barring the context of the UE kept in the inactive state.

Optionally, the first predetermined condition includes that a duration for which the UE is kept in the inactive state reaches a second predetermined time length. The second predetermined time length refers to a preconfigured maximum time length for which the UE is allowed to be kept in the inactive state.

Optionally, the second predetermined time length is a time length preconfigured by the system or determined by the UE and the base station.

Figure 7A:
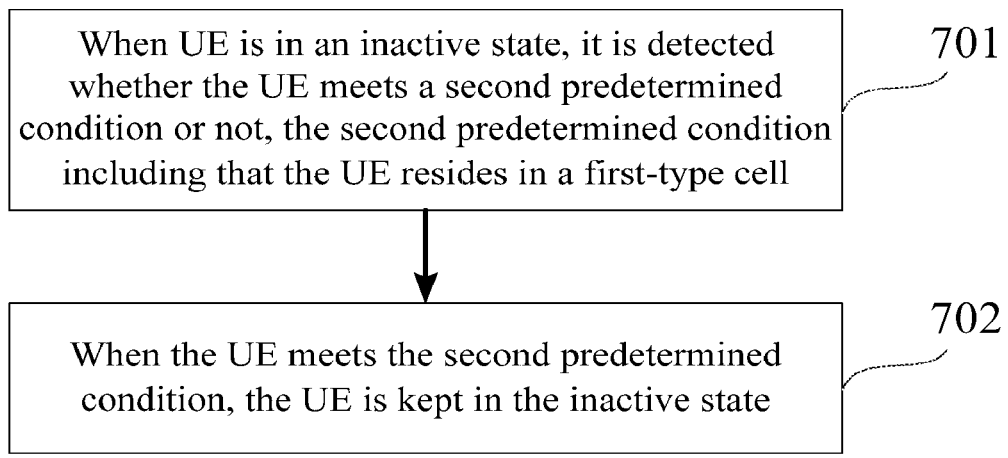
FIG. 7A is a flow chart showing a state keeping method according to an exemplary aspect of the present disclosure.

FIG. 7A is a flow chart showing a state keeping method according to an exemplary aspect. As shown in FIG. 7A, the state keeping method is applied to UE 120 in a mobile communication system shown in FIG. 1, and includes the following steps.

In Step 701, when the UE is in an inactive state, it is detected whether the UE meets a second predetermined condition or not, the second predetermined condition including that the UE resides in a first-type cell.

The first-type cell refers to a cell providing restricted service.

In Step 702, when the UE meets the second predetermined condition, the UE is kept in the inactive state.

That is, when the UE resides in the first-type cell, an AS of the UE is kept in the inactive state.

Optionally, after the UE resides in the first-type cell, if the UE is required to access the first-type cell, the following two manners may be adopted.

According to the first manner, the UE transmits a first connection recovery request, the first connection recovery request being configured to recover access to the first-type cell according to a context stored in the inactive state.

According to the second manner, the UE deletes the context stored in the inactive state, the UE is switched from the inactive state into an idle state, and the UE transmits a first connection establishment request, the first connection establishment request being configured to request to access the first-type cell.

Optionally, it is determined by the AS or is determined by the AS indicated by a NAS of the UE whether the UE transmits the first connection recovery request or the first connection establishment request.

Optionally, the UE does not transmit a RAN side location area update request when residing in the first-type cell.

If the UE does not transmit the RAN side location area update request when residing in the first-type cell, a base station cannot learn about a residing location area of the UE within a period of time. The RAN side location area update request is transmitted until the UE accesses a suitable cell.

Optionally, the UE transmits the RAN side location area update request when accessing the first-type cell for the first time.

Different from the previous condition, the UE transmits the RAN side location area update request only when accessing the first-type cell for the first time. Although the first-type cell does not provide a data transceiving service, a base station side may learn about the residing location area of the UE.

Optionally, when the UE accesses a third-type cell after residing in the first-type cell, the UE transmits the RAN side location area update request, the third-type cell referring to a suitable cell.

The third-type cell is a cell capable of normally transceiving data.

From the above, according to the state keeping method provided in the aspect of the present disclosure, the UE is kept in the inactive state when residing in the first-type cell, so that the UE is not required to perform state switching when accessing the third-type cell again, and may recover the RRC connection again according to the stored context, thereby avoiding the state Ping-Pong problem caused by mobility of the UE between the first-type cell and the third-type cell.

Figure 7B:
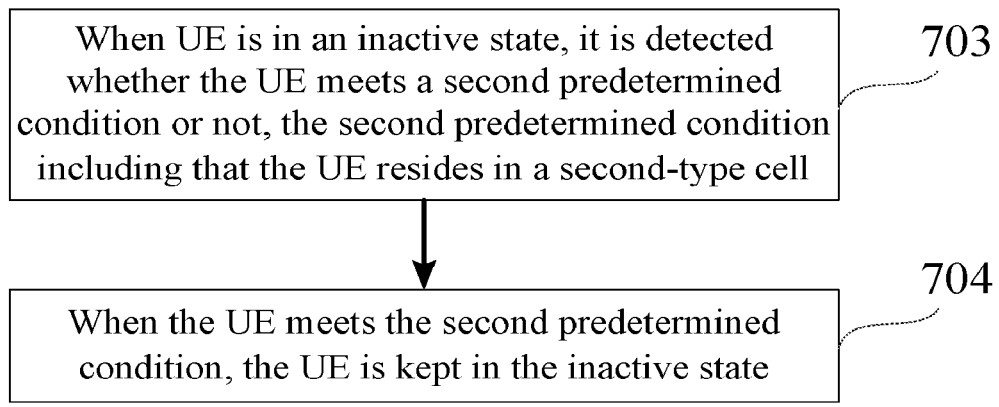
FIG. 7B is a flow chart showing a state keeping method according to an exemplary aspect of the present disclosure.

FIG. 7B is a flow chart showing a state keeping method according to an exemplary aspect. As shown in FIG. 7B, the state keeping method is applied to UE 120 in an implementation environment shown in FIG. 1, and includes the following steps.

In Step 703, when the UE is in an inactive state, it is detected whether the UE meets a second predetermined condition or not, the second predetermined condition including that the UE resides in a second-type cell.

The second-type cell refers to a preconfigured cell barring execution of a predetermined service in the inactive state.

In Step 704, when the UE is in the inactive state and meets the second predetermined condition, the UE is kept in the inactive state.

Optionally, when the UE is kept in the inactive state, no data transceiving service is executed.

Optionally, after the UE resides in the second-type cell, under a service requirement (for example, the UE is required to transmit data), the UE transmits a second connection recovery request, the second connection recovery request being configured to request to access the second-type cell according to a context of the UE in the inactive state.

Optionally, the UE does not transmit a RAN side location area update request when residing in the second-type cell.

If the UE does not transmit the RAN side location area update request when residing in the second-type cell, a base station cannot learn about a residing location area of the UE within a period of time, and the RAN side location area update request is transmitted after the UE accesses a cell allowing work in the inactive state.

Optionally, the UE transmits the RAN side location area update request when accessing the second-type cell for the first time.

Optionally, if a RAN side location area of the UE changes, the UE transmits the RAN side location area update request when accessing a fourth-type cell, wherein the fourth-type cell refers to a preconfigured cell allowing work in the inactive state.

Optionally, if the UE is switched into an idle state, the UE transmits the RAN side location area update request when accessing the fourth-type cell.

Optionally, if the UE receives an update denial message after transmitting the RAN side location area update request, the UE transmits the RAN side location area update request when accessing the fourth-type cell.

Optionally, if the UE receives an accepting message containing an eighth indication after transmitting the RAN side location area update request, the UE transmits the RAN side location area update request when accessing the fourth-type cell, the eighth indication being configured to indicate that the UE is barred to perform a data transceiving service in the inactive state and the accepting message being a response received after the UE transmits the RAN side location area update request.

Optionally, the UE does not transmit the RAN side location area update request when residing in the second-type cell, and the UE transmits the RAN side location area update request when accessing the fourth-type cell.

It is noted that Step 703 to Step 704 in the aspect and the steps in the previous aspect have no direct sequential association, and may be independently executed respectively.

From the above, according to the state keeping method provided in the aspect of the present disclosure, the UE is kept in the inactive state when residing in the second-type cell, so that the UE may recover the RRC connection through the stored context, thereby saving signaling resources at a network side.

In other optional aspects of the present disclosure, when the UE meets any one of the following other second predetermined conditions in the inactive state, the UE is kept in the inactive state.

Optionally, the second predetermined condition includes that after the UE is denied to access a first PLMN, the UE resides in the first-type cell at first, and the UE successfully accesses a second PLMN and resides in the third-type cell according to an indication of a NAS.

Herein, the first-type cell refers to a cell providing restricted service, and the third-type cell may refer to a suitable cell which can provide normal service.

Optionally, the second predetermined condition includes that the UE does not find any cell where the UE can reside. At this moment, the UE is kept in the inactive state, which may be called any cell selection state in the inactive state. Of course, as an alternate solution, if not finding any cell where the UE can reside, the UE may also be switched from the inactive state to an idle state to enter any cell selection state in the idle state.

Optionally, the second predetermined condition includes that the UE receives an access denial message containing a ninth indication after transmitting a second connection establishment request in the inactive state. The second connection establishment request is configured to request to enable the UE to access a residing cell, and the ninth indication is configured to indicate the UE to be kept in the inactive state.

After the UE transmits the second connection establishment request to the base station, the base station transmits to the UE an access denial message clearly indicating that the UE is kept in the inactive state, and the UE is kept in the inactive state according to the access denial message.

Optionally, the second predetermined condition includes that the UE receives an accepting message after transmitting the RAN side location area update request, the accepting message containing a tenth indication and the tenth indication being configured to indicate that the UE is barred to execute the data transceiving service in the inactive state. Herein, the accepting message is a response received after the LTE transmits the RAN side location area update request.

Optionally, the second predetermined condition includes that the UE receives an accepting message after transmitting the RAN side location area update request, and successfully performs RAN side location area update according to the accepting message. Herein the accepting message is a response received after the UE transmits the RAN side location area update request.

Optionally, the second predetermined condition includes that after the UE transmits a RAN side location area update request containing a predetermined ID, the UE receives an accepting message including a denial indication, and successfully performs RAN side location area update according to the accepting message. Herein the predetermined ID is configured to represent that the UE requests to enter a connect state, the denial indication is configured to indicate that the UE is barred to enter the connect state, and the accepting message is a response received after the UE transmits the RAN side location area update request.

Optionally, the second predetermined condition includes that when the number of times for which update continuously fails after the UE transmits the RAN side location area update request reaches a first predetermined number of times, the UE retransmits the RAN side location area update request and recounts the number of times after waiting for a third predetermined time length.

Optionally, the third predetermined time length is a time length preconfigured by the system or agreed by the UE and the base station.

Optionally, the second predetermined condition includes that when the number of times for which update continuously fails after the UE transmits the RAN side location area update request reaches a second predetermined number of times, the UE stops updating and when the UE is required to access the residing cell, retransmits the RAN side location area update request or initiates a third connection recovery request. Herein the third connection recovery request is configured to request to recover access to the residing cell according to the context stored in the inactive state.

Optionally, the second predetermined condition includes that when the number of times for which update continuously fails after the UE transmits the RAN side location area update request reaches a third predetermined number of times, the UE stops updating and reinitiates the RAN side location area update request when the UE accesses a new cell.

Optionally, the second predetermined condition includes that the UE accesses another network except a target network in a cell reselection process. Herein the target network is a network supporting the UE to work in the inactive state.

Optionally, the second predetermined condition includes that the UE accesses the other network except the target network in the cell reselection process, and a time length for which the other network has been accessed is within a fourth predetermined time length.

Optionally, the second predetermined condition includes that the UE accesses a second predetermined network in the cell reselection process. Herein the second predetermined network refers to a preconfigured network allowing the context of the UE in the inactive state to be kept, and the second predetermined network belongs to another network except the target network.

Optionally, the second predetermined condition includes that a duration for which the UE is kept in the inactive state is within a fifth predetermined time length. Herein the fifth predetermined time length refers to a preconfigured maximum time length for which the UE is allowed to be kept in the inactive state.

Optionally, if the base station preconfigures the time length for which the UE is kept in the inactive state, the base station transmits a response message of the RAN side location area update request to update information about a duration for which the UE is kept in the inactive state. After the information about the duration for which the UE is kept in the inactive state is updated, a timer is retimed.

In a possible implementation, if the UE is switched from the inactive state to the connect state, the duration for which the UE is kept in the inactive state is invalid.

Optionally, the second predetermined condition includes that the UE fails to initiate connection recovery. That is, the UE does not receive any response or receives a denial response after transmitting the RRC connection recovery request.

Optionally, the second predetermined condition includes that the UE fails to transmit data or fails to receive data in the inactive state.

From the above, according to the state keeping method provided in the aspect of the present disclosure, the UE is kept in the inactive state, so that the UE is not required to be switched into the connect state during transceiving of a small data packet service, thereby saving signaling resources.

Figure 8:
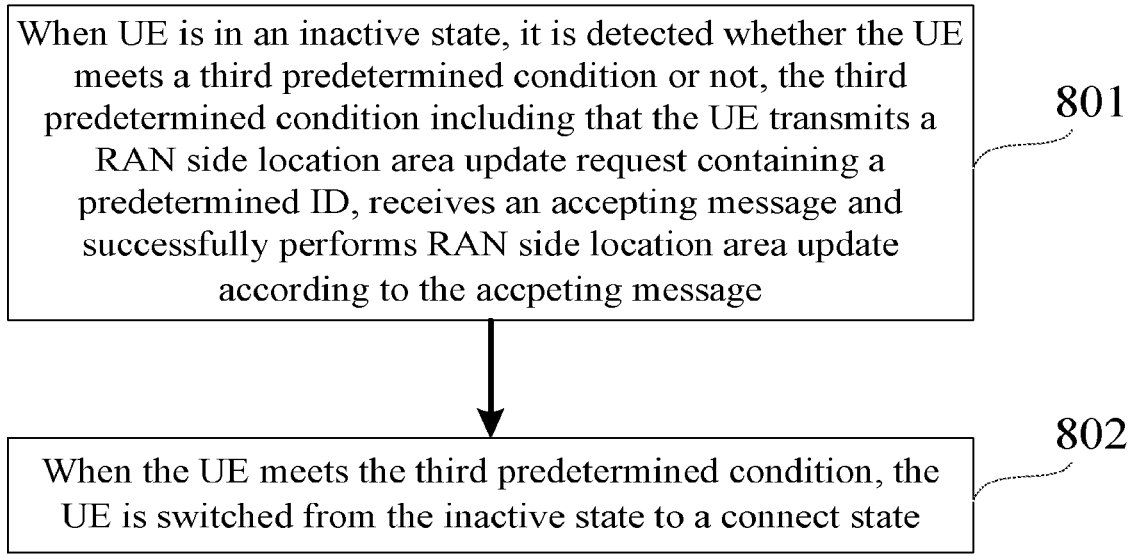
FIG. 8 is a flow chart showing a state switching method according to an exemplary aspect of the present disclosure.

FIG. 8 is a flow chart showing a state switching method according to an exemplary aspect. As shown in FIG. 8, the state switching method is applied to UE 120 in a mobile communication system shown in FIG. 1, and includes the following steps.

In Step 801, when the UE is in an inactive state, it is detected whether the UE meets a third predetermined condition or not, the third predetermined condition including that the UE transmits a RAN side location area update request containing a predetermined ID, receives an accepting message and successfully performs RAN side location area update according to the accepting message.

The RAN side location area update request contains the predetermined ID, and the predetermined ID is configured to request to enter a connect state. That is, when the UE is in the inactive state, if switching back to the connect state is required according to a service requirement, the UE contains the predetermined ID in the RAN side location area update request in a process of transmitting the RAN side location area update request to a base station, and the predetermined ID is configured to represent that the UE requests to enter the connect state.

At this moment, the base station may feedback the accepting message. The accepting message not only represents that location area update of the UE is accepted, but also indicates that the UE is allowed to enter the connect state.

Optionally, the accepting message contains an eleventh indication, the eleventh indication being configured to indicate that the UE is allowed to enter the connect state. Optionally, the accepting message does not contain any indication, and the accepting message is configured to implicitly indicate that the UE is allowed to enter the connect state. In other words, if the base station does not contain any indication in the accepting message, it is indicated that the UE is allowed to enter the connect state. If the base station contains a denial indication in the accepting message, it is indicated that the UE is not allowed to enter the connect state.

After receiving the accepting message, the UE successfully performs RAN side location area update according to the accepting message.

In Step 802, when the UE meets the third predetermined condition, the UE is switched from the inactive state to a connect state.

Optionally, when the accepting message indicates that the UE is allowed to enter the connect state, the UE is switched from the inactive state to the connect state.

In an optional aspect based on FIG. 8, the RAN side location area update request transmitted by the UE to access network equipment or a completion message corresponding to the RAN side location area update request further contains a NAS request. Such a NAS message is configured to trigger NAS location area update or EPC side location area update. The completion message is transmitted after the UE successfully performs RAN side location area update.

In the optional aspect, a mechanism of containing and transmitting the NAS message is triggered after a NAS of the UE determines that the UE enters a new location update area. That is, before the UE transmits the RAN side location area update request containing the predetermined ID and the NAS message to the access network equipment, the method further includes the following step.

The NAS of the UE transmits the NAS message to an AS, or, the NAS of the UE indicates the AS to establish an RRC connection, or, the NAS of the UE indicates the AS to recover the RRC connection.

From the above, according to the state switching method provided in the aspect of the present disclosure, the predetermined ID is contained in the RAN side location area update request transmitted by the UE, and when the accepting message transmitted by the base station clearly indicates connection recovery or does not include a default connection recovery indication, the UE is switched from the inactive state to the connect state, and the UE may receive and transmit each data service in the connect state.

It is noted that state names and message names mentioned in each of the aspects are schematic, and are not limited in the aspects. Any state and message with the same state characteristic or the same message function fall within the scope of protection of the present disclosure.

The below is the device aspects of the present disclosure, which may be adopted to execute the method aspects of the present disclosure. Details undisclosed in the device aspects of the present disclosure may refer to the method aspects of the present disclosure.

Figure 9:
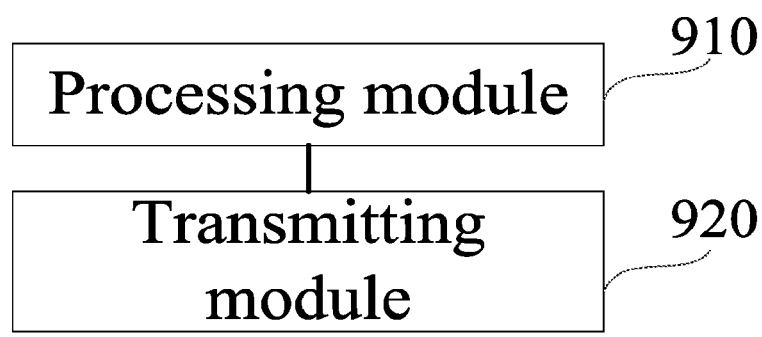
FIG. 9 is a block diagram of a state switching device according to an exemplary aspect of the present disclosure.

FIG. 9 is a block diagram of a state switching device according to an exemplary aspect. As shown in FIG. 9, the state switching device is applied to UE 120 in a mobile communication system shown in FIG. 1, and the state switching device includes but not limited to a processing module 910.

The processing module 910 is configured to, when the UE is in an inactive state and meets a first predetermined condition, switch the UE from the inactive state to an idle state.

The processing module 910 is configured to, when the UE is in the inactive state and meets a second predetermined condition, keep the inactive state.

The processing module 910 is configured to, when the UE is in the inactive state and meets a third predetermined condition, switch the UE from the inactive state to a connect state.

Herein the inactive state is an intermediate state between the connect state and the idle state.

Optionally, the first predetermined condition includes that an AS of the UE receives a first indication of a NAS, the first indication being configured to indicate a NAS state to be switched from an EMM-REGISTERED state to an EMM-DEREGISTERED state.

Optionally, the first predetermined condition includes that after the AS of the UE reports to the NAS that an AS state is the inactive state, the AS of the UE receives a second indication of the NAS, the second indication being configured to indicate the UE to establish an RRC connection.

Optionally, the first predetermined condition includes that the AS of the UE receives a third indication of the NAS, the third indication being configured to indicate the NAS state to be switched from an EMM-connected state to an EMM-idle state.

Herein the inactive state in the AS state corresponds to the EMM-connected state in the NAS state.

Optionally, the first predetermined condition includes that the AS of the UE receives a fourth indication of the NAS, the fourth indication being configured to indicate the NAS state to be switched from an EMM-idle state with an inactive state indication to an EMM-idle state without any inactive state indication.

Herein the inactive state in the AS state corresponds to the EMM-idle state with the inactive state indication in the NAS state.

Optionally, the first predetermined condition includes that the AS of the UE receives a fifth indication of the NAS, the fifth indication being configured to indicate the UE to be switched into the idle state.

Optionally, the first predetermined condition includes that the UE is denied when accessing a new PLMN.

Optionally, the first predetermined condition includes that a SIM card is not inserted into the UE.

Optionally, the first predetermined condition includes that when the UE resides in a first-type cell, a decision making result of the UE is that a first connection establishment request is required to be transmitted to the first-type cell.

Herein the first-type cell refers to a cell configured to provide restricted service, and the first connection establishment request is configured to request to access the first-type cell.

Optionally, the first predetermined condition includes that the UE does not find any cell where the UE can reside; or, a duration for which the UE does not find any cell where the UE can reside reaches a first predetermined time length.

Optionally, the first predetermined condition includes that the UE resides in a second-type cell.

Herein the second-type cell refers to a preconfigured cell barring work in the inactive state.

Optionally, the device further includes a transmitting module 920.

The transmitting module 920 is configured to transmit, by the UE, a second connection establishment request, the second connection establishment request being configured to request to access the second-type cell.

Optionally, the first predetermined condition includes that the UE receives an access denial message after transmitting a third connection establishment request.

Herein the third connection establishment request is configured to request to enable the UE to access a residing cell.

Optionally, the first predetermined condition includes that the UE receives an access denial message containing a sixth indication after transmitting the third connection establishment request, the third connection establishment request being configured to request to enable the UE to access the residing cell, and the sixth indication being configured to indicate the UE to be switched into the idle state; or, the UE receives an access denial message not containing a seventh indication after transmitting the third connection establishment request, the third connection establishment request being configured to request to enable the UE to access the residing cell, and the seventh indication being configured to indicate the UE to be kept in the inactive state.

Optionally, the first predetermined condition includes that the UE receives an update denial message after transmitting a RAN side location area update request.

Herein the RAN side location area update request is configured to request to update a RAN side location area of the UE.

Optionally, the first predetermined condition includes that the number of times for which update continuously fails after the UE initiates the RAN side location area update request reaches a predetermined number of times.

Herein the RAN side location area update request is configured to request to update the RAN side location area of the UE.

Optionally, the first predetermined condition includes that after accessing another network except a target network in a cell reselection process, the UE re-accesses the target network, and a context stored by the UE in the inactive state is lost.

Herein the target network is a network supporting the UE to work in the inactive state.

Optionally, the first predetermined condition includes that the UE accesses a first predetermined network in the cell reselection process.

Herein the first predetermined network refers to a preconfigured network barring the context of the UE kept in the inactive state.

Optionally, the first predetermined condition includes that a duration for which the UE is kept in the inactive state reaches a second predetermined time length.

Herein the second predetermined time length refers to a preconfigured maximum time length for which the UE is allowed to be kept in the inactive state.

Optionally, the second predetermined condition includes that the UE resides in the first-type cell.

Herein the first-type cell refers to the cell providing restricted service.

Optionally, the transmitting module 920 is configured to transmit, by the UE, the first connection recovery request, the first connection recovery request being configured to recover access to the first-type cell according to the context stored in the inactive state.

Alternatively, the transmitting module 920 is configured to delete, by the UE, the context stored in the inactive state, switch the UE from the inactive state into the idle state and transmit, by the UE, the first connection establishment request, the first connection establishment request being configured to request to access the first-type cell.

Optionally, the transmitting module 920 is configured to transmit no RAN side location area update request when residing in the first-type cell.

Alternatively, the transmitting module 920 is configured to transmit the RAN side location area update request when accessing the first-type cell for the first time.

Optionally, the transmitting module 920 is further configured to, when the UE accesses a third-type cell, transmit the RAN side location area update request, the third-type cell referring to a suitable cell.

Optionally, the second predetermined condition includes that after the UE is denied to access a first PLMN, the UE resides in the first-type cell at first, and the UE successfully accesses a second PLMN and resides in the third-type cell according to an indication of the NAS.

Herein the first-type cell refers to the cell providing the restricted service, and the third-type cell refers to the suitable cell.

Optionally, the second predetermined condition includes that the UE does not find any cell where the UE can reside.

Optionally, the second predetermined condition includes that the UE resides in the second-type cell.

Herein the second-type cell refers to a preconfigured cell barring execution of a predetermined service in the inactive state.

Optionally, the transmitting module 920 is configured to, when residing in the second-type cell, transmit no RAN side location area update request.

Alternatively, the transmitting module 920 is further configured to, when accessing the second-type cell for the first time, transmit the RAN side location area update request.

Alternatively, the transmitting module 920 is further configured to, if a RAN side location area of the UE changes, transmit the RAN side location area update request when accessing a fourth-type cell.

Alternatively, the transmitting module 920 is further configured to, if the UE is switched into the idle state, transmit the RAN side location area update request when accessing the fourth-type cell.

Alternatively, the transmitting module 920 is further configured to, if the update denial message is received after the RAN side location area update request is transmitted, transmit the RAN side location area update request when accessing the fourth-type cell.

Alternatively, the transmitting module 920 is further configured to, if the UE receives an accepting message containing an eighth indication after transmitting the RAN side location area update request, transmit the RAN side location area update request when accessing the fourth-type cell, the eighth indication being configured to indicate that the UE is barred to perform the data transceiving service in the inactive state and the accepting message being a response received after the UE transmits the RAN side location area update request.

Alternatively, the transmitting module 920 is further configured to transmit no RAN side location area update request when the UE resides in the second-type cell, and transmit the RAN side location area update request when the UE accesses the fourth-type cell.

Herein the fourth-type cell refers to a preconfigured cell allowing work in the inactive state.

Optionally, the processing module 910 is further configured to execute no data transceiving service when the UE is kept in the inactive state.

Optionally, the transmitting module 920 is configured to transmit, by the UE, a second connection recovery request, the second connection recovery request being configured to request to recover access to the second-type cell according to the context of the UE in the inactive state.

Optionally, the second predetermined condition includes that the UE receives an access denial message containing a ninth indication after transmitting a second connection establishment request.

Herein the second connection establishment request is configured to request to enable the UE to access a residing cell, and the ninth indication is configured to indicate the UE to be kept in the inactive state.

Optionally, the second predetermined condition includes that the UE receives an accepting message after transmitting the RAN side location area update request, the accepting message containing a tenth indication and the tenth indication being configured to indicate that the UE is barred to execute the data transceiving service in the inactive state.

Herein the accepting message is a response received after the UE transmits the RAN side location area update request.

Optionally, the second predetermined condition includes that the UE receives an accepting message after transmitting the RAN side location area update request, and successfully performs RAN side location area update according to the accepting message.

Herein the accepting message is a response received after the UE transmits the RAN side location area update request, the RAN side location area update request does not contain a predetermined ID, and the predetermined ID is configured to request to enter the connect state.

Optionally, the second predetermined condition includes that after the UE transmits a RAN side location area update request containing the predetermined ID, the UE receives an accepting message including a denial indication, and successfully performs RAN side location area update according to the accepting message.

Herein the predetermined ID is configured to represent that the UE requests to enter the connect state, the denial indication is configured to indicate that the UE is barred to enter the connect state, and the accepting message is a response received after the UE transmits the RAN side location area update request.

Optionally, the second predetermined condition includes that when the number of times for which update continuously fails after the UE transmits the RAN side location area update request reaches a first predetermined number of times, the UE retransmits the RAN side location area update request and recounts the number of times after waiting for a third predetermined time length.

Optionally, the second predetermined condition includes that when the number of times for which update continuously fails after the UE transmits the RAN side location area update request reaches a second predetermined number of times, the UE stops updating and when the UE is required to access the residing cell, retransmits the RAN side location area update request or initiates a third connection recovery request.

Herein the third connection recovery request is configured to request to recover access to the residing cell according to the context stored in the inactive state.

Optionally, the second predetermined condition includes that when the number of times for which update continuously fails after the UE transmits the RAN side location area update request reaches a third predetermined number of times, the UE stops updating and reinitiates the RAN side location area update request when the UE accesses a new cell.

Optionally, the second predetermined condition includes that the UE accesses another network except the target network in the cell reselection process. The target network is the network supporting the UE to work in the inactive state.

Optionally, the second predetermined condition includes that the UE accesses the other network except the target network in the cell reselection process, and a time length for which the other network has been accessed is within a fourth predetermined time length.

Herein the target network is the network supporting the UE to work in the inactive state.

Optionally, the second predetermined condition includes that the UE accesses a second predetermined network in the cell reselection process.

Herein the second predetermined network refers to a preconfigured network allowing the context of the UE in the inactive state to be kept, and the second predetermined network belongs to another network except the target network.

Herein the target network is the network supporting the UE to work in the inactive state.

Optionally, the second predetermined condition includes that a duration for which the UE is kept in the inactive state is within a fifth predetermined time length.

Herein the fifth predetermined time length refers to a preconfigured maximum time length for which the UE is allowed to be kept in the inactive state.

Optionally, the second predetermined condition includes that the UE fails to initiate connection recovery.

Optionally, the second predetermined condition includes that the UE fails to transmit data or fails to receive data in the inactive state.

Optionally, the third predetermined condition includes that the UE transmits the RAN side location area update request, and receives the accepting message; and the UE successfully performs RAN side location area update according to the accepting message.

Herein the RAN side location area update request contains the predetermined ID, the predetermined ID is configured to request to enter the connect state, and the accepting message is configured to indicate that location area update of the UE is accepted and the UE is allowed to enter the connect state.

Optionally, the RAN side location area update request or a completion message corresponding to the RAN side location area update request further contains a NAS request.

The processing module is further configured to, before the UE transmits the RAN side location area update request and receives the accepting message, transmit the NAS message to the AS through the NAS of the UE, or, indicate the AS to establish the RRC connection through the NAS of the UE, or, indicate the AS to recover the RRC connection through the NAS of the UE.

Optionally, the accepting message contains an eleventh indication, the eleventh indication being configured to indicate that the UE is allowed to enter the connect state; or, the accepting message does not contain any indication, and the accepting message is configured to implicitly indicate that the UE is allowed to enter the connect state.

From the above, according to the state switching device provided in the aspect of the present disclosure, the inactive state is added in the UE, so that the UE in the inactive state may receive and transmit a small data packet service without being switched to the connect state. Therefore, the problem of signaling resource waste caused by the fact that the UE is required to be switched between the connect state and the idle state even during transceiving of the small data packet service in 4G is solved, thereby enabling the UE in the inactive state to receive and transmit the small data packet service and saving signaling resources.

With respect to the devices in the above aspect, the specific manners for performing operations for individual modules therein have been described in detail in the aspects regarding the methods, which will not be elaborated herein.

An exemplary aspect of the present disclosure provides UE, which may implement a state switching method provided by the present disclosure, the UE including a processor and a memory configured to store instructions executable by the processor.

The processor is configured to when the UE is in an inactive state and meets a first predetermined condition, switch the UE from the inactive state to an idle state.

Herein the inactive state is an intermediate state between a connect state and the idle state.

An exemplary aspect of the present disclosure provides UE, which may implement a state keeping method provided by the present disclosure, the UE including a processor and a memory configured to store instructions executable by the processor.

The processor is configured to when the UE is in an inactive state and meets a second predetermined condition, keep the UE in the inactive state.

Herein the inactive state is an intermediate state between a connect state and an idle state.

An exemplary aspect of the present disclosure provides UE, which may implement a state switching method provided by the present disclosure, the UE including a processor and a memory configured to store instructions executable by the processor.

The processor is configured to when the UE is in an inactive state and meets a third predetermined condition, switch the UE from the inactive state to a connect state.

Herein the inactive state is an intermediate state between the connect state and an idle state.

Figure 10:
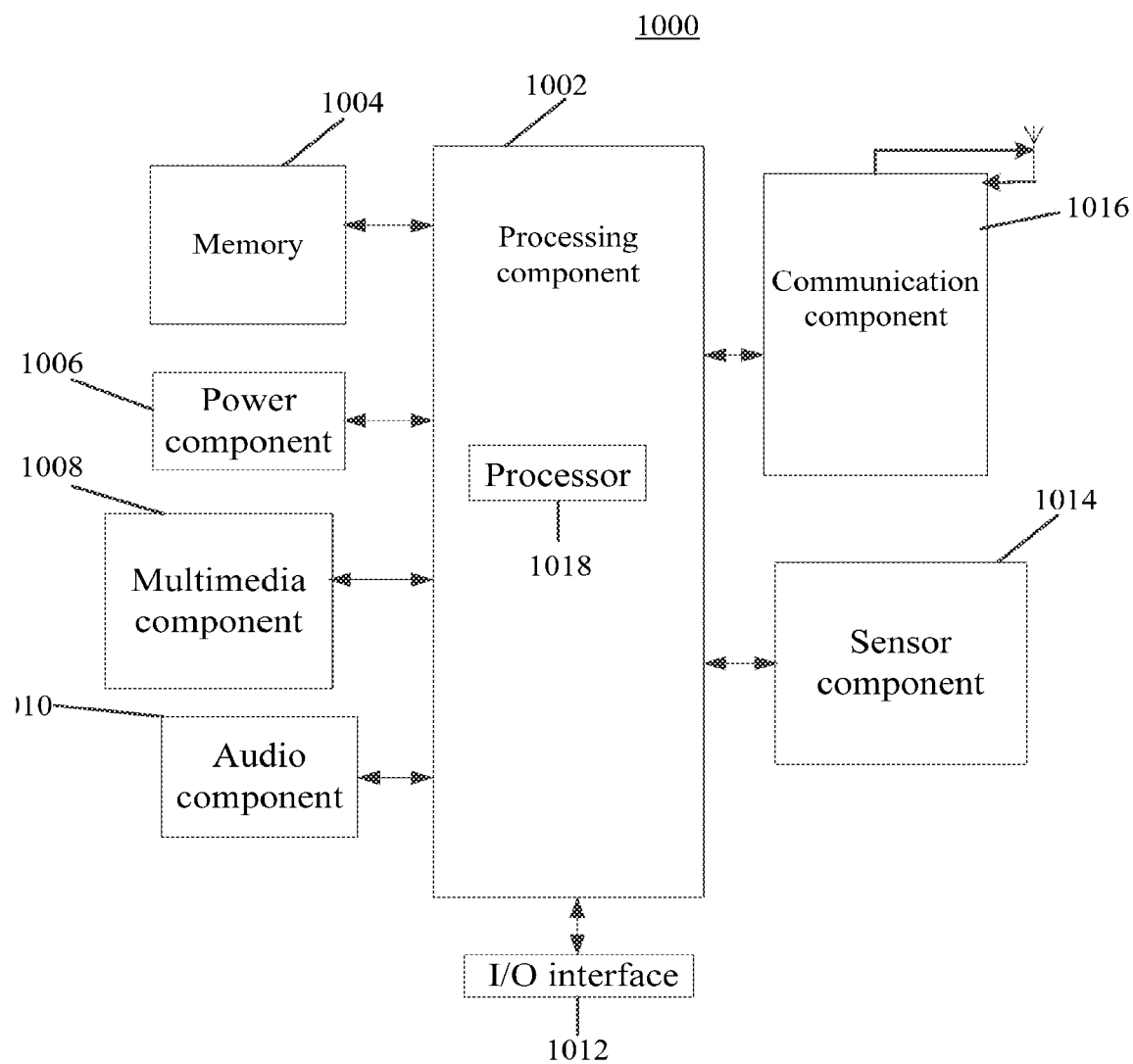
FIG. 10 is a block diagram of UE according to an exemplary aspect of the present disclosure.

FIG. 10 is a block diagram of UE according to an exemplary aspect. The UE 1000 may be a mobile phone, a computer, a digital broadcast terminal, a messaging device, a gaming console, a tablet, a medical device, exercise equipment, a personal digital assistant or the like.

Referring to FIG. 10, the UE 1000 may include one or more of the following components: a processing component 1002, a memory 1004, a power component 1006, a multimedia component 1008, an audio component 1010, an Input/Output (I/O) interface 1012, a sensor component 1014, and a communication component 1016.

The processing component 1002 typically controls overall operations of the UE 1000, such as the operations associated with display, telephone calls, data communications, camera operations, and recording operations. The processing component 1002 may include one or more processors 1018 to execute instructions to perform all or part of the steps in the abovementioned method. Moreover, the processing component 1002 may include one or more modules which facilitate interaction between the processing component 1002 and the other components. For instance, the processing component 1002 may include a multimedia module to facilitate interaction between the multimedia component 1008 and the processing component 1002.

The memory 1004 is configured to store various types of data to support the operation of the UE 1000. Examples of such data include instructions for any application programs or methods operated on the UE 1000, contact data, phonebook data, messages, pictures, video, etc. The memory 1004 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1006 provides power for various components of the UE 1000. The power component 1006 may include a power management system, one or more power supplies, and other components associated with the generation, management and distribution of power for the UE 1000.

The multimedia component 1008 includes a screen providing an output interface between the UE 1000 and a user. In some aspects, the screen may include a Liquid Crystal Display (LCD) and a Touch Panel (TP). If the screen includes the TP, the screen may be implemented as a touch screen to receive an input signal from the user. The TP includes one or more touch sensors to sense touches, slides and gestures on the TP. The touch sensors may not only sense a boundary of a touch or slide action, but also detect a duration and pressure associated with the touch or slide action. In some aspects, the multimedia component 1008 includes a front camera and/or a rear camera. The front camera and/or the rear camera may receive external multimedia data when the UE 1000 is in an operation mode, such as a photographing mode or a video mode. Each of the front camera and the rear camera may be a fixed optical lens system or have focusing and optical zooming capabilities.

The audio component 1010 is configured to output and/or input an audio signal. For example, the audio component 1010 includes a Microphone (MIC), and the MIC is configured to receive an external audio signal when the UE 1000 is in the operation mode, such as a call mode, a recording mode and a voice recognition mode. The received audio signal may be further stored in the memory 1004 or transmitted through the communication component 1016. In some aspects, the audio component 1010 further includes a speaker configured to output the audio signal.

The I/O interface 1012 provides an interface between the processing component 1002 and a peripheral interface module, and the peripheral interface module may be a keyboard, a click wheel, a button and the like. The button may include, but not limited to: a home button, a volume button, a starting button and a locking button.

The sensor component 1014 includes one or more sensors configured to provide status assessment in various aspects for the UE 1000. For instance, the sensor component 1014 may detect an on/off status of the UE 1000 and relative positioning of components, such as a display and small keyboard of the device 2600, and the sensor component 1014 may further detect a change in a position of the UE 1000 or a component of the UE 1000, presence or absence of contact between the user and the UE 1000, orientation or acceleration/deceleration of the UE 1000 and a change in temperature of the UE 1000. The sensor component 1014 may include a proximity sensor configured to detect presence of an object nearby without any physical contact. The sensor component 1014 may also include a light sensor, such as a Complementary Metal Oxide Semiconductor (CMOS) or Charge Coupled Device (CCD) image sensor, configured for use in an imaging application. In some aspects, the sensor component 1014 may also include an acceleration sensor, a gyroscope sensor, a magnetic sensor, a pressure sensor or a temperature sensor.

The communication component 1016 is configured to facilitate wired or wireless communication between the UE 1000 and other equipment. The UE 1000 may access a communication-standard-based wireless network, such as a Wireless Fidelity (WiFi) network, a 2G or 3G network or a combination thereof. In an exemplary aspect, the communication component 1016 receives a broadcast signal or broadcast associated information from an external broadcast management system through a broadcast channel. In an exemplary aspect, the communication component 1016 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In an exemplary aspect, the UE 1000 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the state switching method or state keeping method provided by each method aspect.

In an exemplary aspect, there is also provided a non-transitory computer-readable storage medium including an instruction, such as the memory 1004 including an instruction, and the instruction may be executed by the processor 1018 of the UE 1000 to implement the abovementioned state switching method or state keeping method. For example, the non-transitory computer-readable storage medium may be a ROM, a Random Access Memory (RAM), a Compact Disc Read-Only Memory (CD-ROM), a magnetic tape, a floppy disc, optical data storage equipment and the like.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:
1. A state keeping method, comprising:
   determining whether a user equipment (UE) is in an inactive state, wherein the inactive state is an intermediate state between a connect state and an idle state;
   determining whether the UE meets a predetermined condition; and keeping the UE in the inactive state when it is determined that the UE is in the inactive state and meets the predetermined condition, wherein the UE meets the predetermined condition when:
(i) the UE resides in a first-type cell, wherein the first-type cell is configured to provide restricted service; or
(ii) the UE fails to find any cell that is available for the UE to reside in; or
(iii) the UE resides in a second-type cell, wherein the second-type cell is configured to bar execution of a predetermined service in the inactive state; or
(iv) after the UE is denied access to a first Public Land Mobile Network (PLMN), the UE resides in the first-type cell at first, and the UE successfully accesses a second PLMN and resides in a third-type cell according to an indication of a Non-Access Stratum (NAS), wherein the third-type cell is configured to provide regular service; or
(v) the UE receives an access denial message with a first indication after transmitting a first connection establishment request, wherein the first connection establishment request is configured to request access to a residing cell, and the first indication is configured to indicate the UE to maintain the inactive state; or
(vi) the UE receives an acceptance message after transmitting a Radio Access Network (RAN) side location area update request, the acceptance message includes a second indication that is configured to bar the UE from executing a data transceiving service in the inactive state, wherein the acceptance message is a response that is received after the UE transmits the RAN side location area update request; or
(vii) the UE receives the acceptance message after transmitting the RAN side location area update request, and successfully performs a RAN side location area update according to the acceptance message, wherein the acceptance message is a response that is received after the UE transmits the RAN side location area update request without a predetermined Identifier (ID), and the predetermined ID is configured to enter the connect state; or
(viii) after the UE transmits the RAN side location area update request including the predetermined ID, the UE receives the acceptance message including a denial indication, and successfully performs the RAN side location area update based on the acceptance message, wherein the predetermined ID is configured to indicate that the UE is requesting to enter the connect state, the denial indication is configured to indicate that the UE is barred to enter the connect state, and the acceptance message is a response received after the UE transmits the RAN side location area update request; or
(ix) a number of times for which update continuously fails after the UE transmits the RAN side location area update request reaches a first predetermined number of times, the UE retransmits the RAN side location area update request and recounts the number of times after waiting for a first predetermined time length; or
(x) the number of times for which update continuously fails after the UE transmits the RAN side location area update request reaches a second predetermined number of times, the UE stops updating and waits until the UE is required to access a residing cell to retransmit the RAN side location area update request or initiates a first connection recovery request, wherein the first connection recovery request is configured to request to recover access to the residing cell based on a context stored in the inactive state; or
(xi) the number of times for which update continuously fails after the UE transmits the RAN side location area update request reaches a third predetermined number of times, the UE stops updating and waits until the UE accesses a new cell to reinitiate the RAN side location area update request; or
(xii) the UE accesses another network except a target network in a cell reselection process, wherein the target network is a network that permits the UE to work in the inactive state; or
(xiii) the UE accesses the another network except the target network in the cell reselection process, and a time length for which the another network has been accessed is within a second predetermined time length, wherein the target network is a network that permits the UE to work in the inactive state; or
(xiv) the UE accesses a second predetermined network in the cell reselection process, wherein the second predetermined network is a preconfigured network that permits the UE to keep context in the inactive state, and the second predetermined network belongs to the another network except the target network, wherein the target network is the network that permits the UE to work in the inactive state; or
(xv) a duration for which the UE is kept in the inactive state is within a third predetermined time length, wherein the third predetermined time length is a preconfigured maximum time length for which the UE is permitted to maintain the inactive state; or
(xvi) the UE fails to initiate connection recovery; or
(xvii) the UE fails to transmit data or fails to receive data in the inactive state, wherein the method further comprises:
determining that the UE meets the predetermined condition when the UE resides in the second-type cell;
transmitting no RAN side location area update request; or
when the UE accesses the second-type cell for the first time, transmitting the RAN side location area update request; or
if a RAN side location area of the UE changes, transmitting, by the UE, the RAN side location area update request when accessing a fourth-type cell; or
if the UE is switched into the idle state, transmitting, by the UE, the RAN side location area update request when accessing the fourth-type cell; or
if the UE receives an update denial message after transmitting the RAN side location area update request, transmitting, by the UE, the RAN side location area update request when accessing the fourth-type cell; or
if the UE receives an acceptance message with a third indication after transmitting the RAN side location area update request, transmitting, by the UE, the RAN side location area update request when accessing the fourth-type cell, wherein the third indication is configured to bar the UE from performing a data transceiving service in the inactive state, and wherein the acceptance message is a response received after the UE transmits the RAN side location area update request; or not transmitting, by the UE, the RAN side location area update request when residing in the second-type cell, and transmitting, by the UE, the RAN side location area update request when accessing the fourth-type cell, wherein the fourth-type cell is a preconfigured cell that permits work in the inactive state.

2. The method of claim 1, further comprising:

determining that the UE meets the predetermined condition when the UE resides in the first-type cell;

transmitting, by the UE, a second connection recovery request, wherein the second connection recovery request is configured to recover access to the first-type cell based on the context stored in the inactive state; or deleting, by the UE, the context stored in the inactive state, switching the UE from the inactive state into the idle state, and transmitting, by the UE, a second connection establishment request, wherein the second connection establishment request is configured to request access to the first-type cell; or not transmitting, by the UE, the RAN side location area update request when residing in the first-type cell; or transmitting, by the UE, the RAN side location area update request when accessing the first-type cell for the first time.

3. A state keeping device, comprising:

a processor; and a memory configured to store instructions executable by the processor, wherein the processor is configured to:
- determine whether a user equipment (UE) is in an inactive state, wherein the inactive state is an intermediate state between a connect state and an idle state;
- determine whether the UE meets a predetermined condition; and
- keep the UE in the inactive state when it is determined that the UE is in the inactive state and meets the predetermined condition,
- wherein the UE meets the predetermined condition when:
  - (i) the UE resides in a first-type cell, wherein the first-type cell is configured to provide restricted service; or
  - (ii) the UE fails to find any cell that is available for the UE to reside in; or
  - (iii) the UE resides in a second-type cell, wherein the second-type cell is configured to bar execution of a predetermined service in the inactive state; or
  - (iv) after the UE is denied access to a first Public Land Mobile Network (PLMN), the UE resides in the first-type cell at first, and the UE successfully accesses a second PLMN and resides in a third-type cell according to an indication of a Non-Access Stratum (NAS), wherein the third-type cell is configured to provide regular service; or
  - (v) the UE receives an access denial message with a first indication after transmitting a first connection establishment request, wherein the first connection establishment request is configured to request access to a residing cell, and the first indication is configured to indicate the UE to maintain the inactive state; or
  - (vi) the UE receives an acceptance message after transmitting a Radio Access Network (RAN) side location area update request, the acceptance message includes a second indication that is configured to bar the UE from executing a data transceiving service in the inactive state, wherein the acceptance message is a response that is received after the UE transmits the RAN side location area update request; or
  - (vii) the UE receives the acceptance message after transmitting the RAN side location area update request, and successfully performs a RAN side location area update according to the acceptance message, wherein the acceptance message is a response that is received after the UE transmits the RAN side location area update request without a predetermined Identifier (ID), and the predetermined ID is configured to request to enter the connect state; or
  - (viii) after the UE transmits the RAN side location area update request including the predetermined ID, the UE receives the acceptance message including a denial indication, and successfully performs the RAN side location area update based on the acceptance message, wherein the predetermined ID is configured to indicate that the UE is requesting to enter the connect state, the denial indication is configured to indicate that the UE is barred to enter the connect state, and the acceptance message is a response received after the UE transmits the RAN side location area update request; or
  - (ix) a number of times for which update continuously fails after the UE transmits the RAN side location area update request reaches a first predetermined number of times, the UE retransmits the RAN side location area update request and recounts the number of times after waiting for a first predetermined time length; or
  - (x) the number of times for which update continuously fails after the UE transmits the RAN side location area update request reaches a second predetermined number of times, the UE stops updating and waits until the UE is required to access a residing cell to retransmit the RAN side location area update request or initiates a first connection recovery request, wherein the first connection recovery request is configured to request to recover access to the residing cell based on a context stored in the inactive state; or
  - (xi) the number of times for which update continuously fails after the UE transmits the RAN side location area update request reaches a third predetermined number of times, the UE stops updating and waits until the UE accesses a new cell to reinitiate the RAN side location area update request; or
  - (xii) the UE accesses another network except a target network in a cell reselection process, wherein the target network is a network that permits the UE to work in the inactive state; or
  - (xiii) the UE accesses the another network except the target network in the cell reselection process, and a time length for which the another network has been accessed is within a second predetermined time length, wherein the target network is a network that permits the UE to work in the inactive state; or
  - (xiv) the UE accesses a second predetermined network in the cell reselection process, wherein the second predetermined network is a preconfigured network that permits the UE to keep context in the inactive state, and the second predetermined network belongs to the another network except the target network, wherein the target network is the network that permits the UE to work in the inactive state; or
(xv) a duration for which the UE is kept in the inactive state is within a third predetermined time length, wherein the third predetermined time length is a preconfigured maximum time length for which the UE is permitted to maintain the inactive state; or
(xvi) the UE fails to initiate connection recovery; or
(xvii) the UE fails to transmit data or fails to receive data in the inactive state,
wherein the device further comprises:
  a transmission module configured to, when it is determine that the UE resides in the second-type cell:
    transmit no RAN side location area update request; or
    when accessing the second-type cell for the first time, transmit the RAN side location area update request; or
    if a RAN side location area changes, transmit the RAN side location area update request when accessing a fourth-type cell; or
    if the UE is switched into the idle state, transmit the RAN side location area update request when accessing the fourth-type cell; or
    if an update denial message is received after the RAN side location area update request is transmitted, transmit the RAN side location area update request when accessing the fourth-type cell; or
    if an acceptance message with a third indication is received after the RAN side location area update request is transmitted, transmit the RAN side location area update request when accessing the fourth-type cell, wherein the third indication is configured to bar the UE from performing a data transceiving service in the inactive state, and wherein the acceptance message is a response received after the UE transmits the RAN side location area update request; or
    not transmit the RAN side location area update request when residing in the second-type cell, and transmit the RAN side location area update request when accessing the fourth-type cell, wherein the fourth-type cell is a preconfigured cell that permits work in the inactive state.

4. The device of claim 3, further comprising:
a transmitter configured to:
  after determining that the UE resides in the first-type cell, transmit a second connection recovery request, wherein the second connection recovery request is configured to recover access to the first-type cell based on the context stored in the inactive state; or
  after determining that the UE resides in the first-type cell, delete the context stored in the inactive state, switch the UE from the inactive state into the idle state, and transmit a second connection establishment request, wherein the second connection establishment request is configured to request access to the first-type cell; or
  not transmit the RAN side location area update request when residing in the first-type cell; or
  transmit the RAN side location area update request when accessing the first-type cell for the first time.

* * * * *